(12) United States Patent
Tanaka et al.

(10) Patent No.: US 12,542,958 B2
(45) Date of Patent: Feb. 3, 2026

(54) VIDEO CREATION METHOD

(71) Applicant: FUJIFILM Corporation, Tokyo (JP)

(72) Inventors: Koichi Tanaka, Saitama (JP); Tetsu Wada, Saitama (JP); Yukinori Nishiyama, Saitama (JP); Yuya Nishio, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/745,851

(22) Filed: May 16, 2022

(65) Prior Publication Data

US 2022/0279106 A1    Sep. 1, 2022

Related U.S. Application Data

(63) Continuation of application No. PCT/JP2020/039489, filed on Oct. 21, 2020.

(30) Foreign Application Priority Data

Nov. 25, 2019 (JP) ................................. 2019-211957

(51) Int. Cl.
*H04N 23/53* (2023.01)
*G03B 7/091* (2021.01)
(Continued)

(52) U.S. Cl.
CPC ....... *H04N 23/53* (2023.01); *H04N 21/47205* (2013.01); *H04N 23/58* (2023.01)

(58) Field of Classification Search
None
See application file for complete search history.

(56) References Cited

U.S. PATENT DOCUMENTS

| 6,961,091 B1 * | 11/2005 | Kubo | H04N 23/74 348/370 |
| 2003/0210345 A1 * | 11/2003 | Nakamura | H04N 23/741 348/E5.034 |

(Continued)

FOREIGN PATENT DOCUMENTS

| JP | H11220653 | 8/1999 |
| JP | 2004194309 | 7/2004 |

(Continued)

OTHER PUBLICATIONS

"Notice of Reasons for Refusal of Japan Counterpart Application", issued on Apr. 11, 2023, with English translation thereof, p. 1-p. 8.

(Continued)

*Primary Examiner* — Hung Q Dang
(74) *Attorney, Agent, or Firm* — JCIPRNET

(57) ABSTRACT

Provided is a video creation method capable of obtaining a good image quality of a video obtained by extracting a part of a captured video even in a case in which a position of the extracted region is changed.
The video creation method according to an embodiment of the present invention includes a setting step of setting, in an imaging region of a first video having a first angle of view, a plurality of regions having a second angle of view smaller than the first angle of view, a designation step of designating, out of a first region and a second region included in the plurality of regions, the second region having a smaller appropriate exposure amount than the first region as a reference region, and a condition determination step of determining at least one condition of an exposure time in a case in which the first video is captured or a stop amount for an incidence ray on the imaging lens based on the appropriate exposure amount of the reference region.

13 Claims, 15 Drawing Sheets

FIRST ADJUSTMENT DATA

| ELAPSED TIME FROM ADJUSTMENT START | STOP AMOUNT | EXPOSURE TIME | SENSITIVITY |
|---|---|---|---|
| 0 | 5 | 5 | 6 |
| t1 | 5.5 | 6.5 | 5 |
| t2 | 6 | 6 | 5 |
| t3 | 6.5 | 5.5 | 5 |
| t4 | 6.8 | 5.2 | 5 |
| t5 | 7 | 5 | 5 |

SECOND ADJUSTMENT DATA

| ELAPSED TIME FROM ADJUSTMENT START | STOP AMOUNT | EXPOSURE TIME | SENSITIVITY |
|---|---|---|---|
| 0 | 5 | 5 | 6 |
| t1 | 7 | 5 | 5 |
| t2 | 7 | 5 | 5 |
| t3 | 7 | 5 | 5 |
| t4 | 7 | 5 | 5 |
| t5 | 7 | 5 | 5 |

(51) Int. Cl.
| | |
|---|---|
| *G03B 15/00* | (2021.01) |
| *H04N 5/268* | (2006.01) |
| *H04N 5/272* | (2006.01) |
| *H04N 21/472* | (2011.01) |
| *H04N 21/854* | (2011.01) |
| *H04N 23/58* | (2023.01) |
| *H04N 23/70* | (2023.01) |
| *H04N 23/75* | (2023.01) |
| *H04N 23/76* | (2023.01) |

(56) References Cited

U.S. PATENT DOCUMENTS

| | | | |
|---|---|---|---|
| 2008/0043108 A1* | 2/2008 | Jung | H04N 23/667 386/E5.072 |
| 2008/0259181 A1* | 10/2008 | Yamashita | H04N 23/71 348/229.1 |
| 2011/0050958 A1 | 3/2011 | Kai | |
| 2013/0329106 A1* | 12/2013 | Bigioi | G03B 3/10 348/308 |
| 2018/0013949 A1* | 1/2018 | Han | H04N 23/62 |

FOREIGN PATENT DOCUMENTS

| | | |
|---|---|---|
| JP | 2005065176 | 3/2005 |
| JP | 2008109551 | 5/2008 |
| JP | 2008164731 | 7/2008 |
| JP | 2009010694 A  * | 1/2009 |
| JP | 2011077680 | 4/2011 |
| JP | 2014042357 | 3/2014 |
| WO | 2009141955 | 11/2009 |

OTHER PUBLICATIONS

"International Search Report (Form PCT/ISA/210) of PCT/JP2020/039489," mailed on Jan. 19, 2021, with English translation thereof, pp. 1-10.
"Written Opinion of the International Searching Authority (Form PCT/ISA/237) of PCT/JP2020/039489," mailed on Jan. 19, 2021, with English translation thereof, pp. 1-10.
"Notice of Reasons for Refusal of Japan Counterpart Application", issued on Oct. 3, 2023, with English translation thereof, p. 1-p. 5.
"Office Action of China Counterpart Application", issued on Apr. 23, 2024, with English translation thereof, p. 1-p. 15.
"Office Action of China Counterpart Application", issued on Dec. 12, 2024, with English translation thereof, p. 1-p. 11.

* cited by examiner

FIG. 4
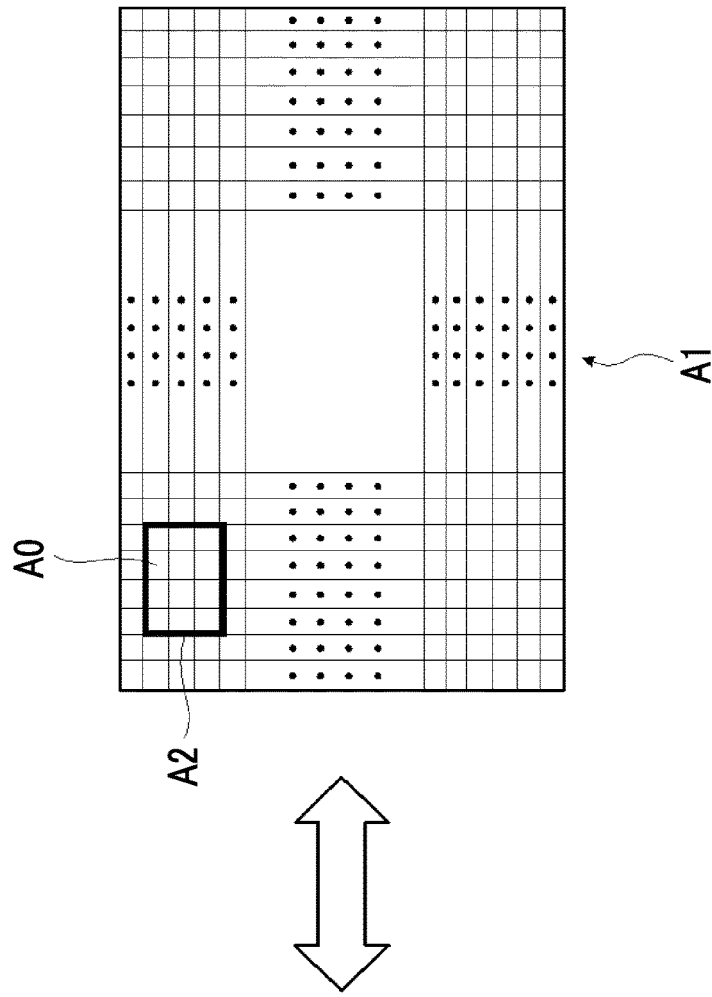
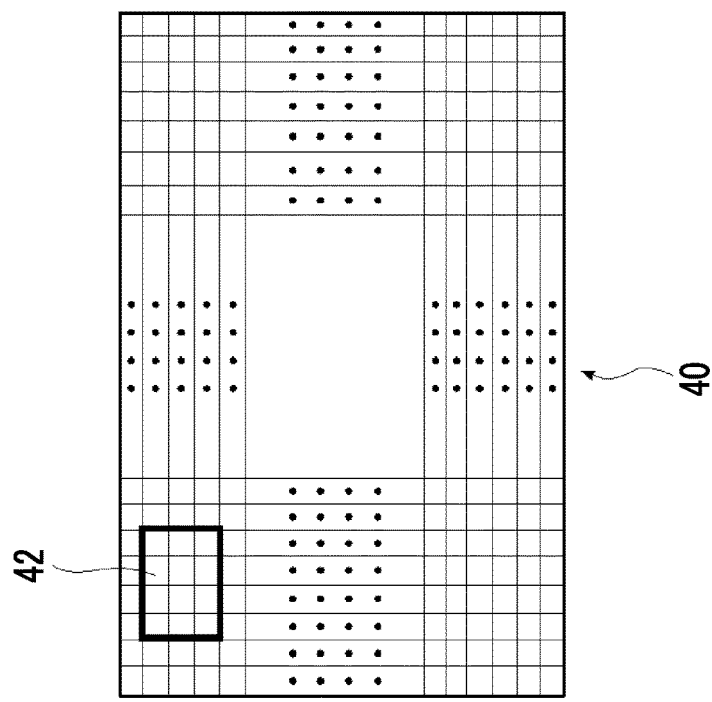

FIG. 18

FIRST ADJUSTMENT DATA

| ELAPSED TIME FROM ADJUSTMENT START | STOP AMOUNT | EXPOSURE TIME | SENSITIVITY |
|---|---|---|---|
| 0 | 5 | 5 | 6 |
| t1 | 5.5 | 6.5 | 5 |
| t2 | 6 | 6 | 5 |
| t3 | 6.5 | 5.5 | 5 |
| t4 | 6.8 | 5.2 | 5 |
| t5 | 7 | 5 | 5 |

SECOND ADJUSTMENT DATA

| ELAPSED TIME FROM ADJUSTMENT START | STOP AMOUNT | EXPOSURE TIME | SENSITIVITY |
|---|---|---|---|
| 0 | 5 | 5 | 6 |
| t1 | 7 | 5 | 5 |
| t2 | 7 | 5 | 5 |
| t3 | 7 | 5 | 5 |
| t4 | 7 | 5 | 5 |
| t5 | 7 | 5 | 5 |

VIDEO CREATION METHOD

CROSS-REFERENCE TO RELATED APPLICATIONS

This application is a Continuation of PCT International Application No. PCT/JP2020/039489 filed on Oct. 21, 2020, which claims priority under 35 U.S.C. § 119(a) to Japanese Patent Application No. 2019-211957 filed on Nov. 25, 2019. The above application is hereby expressly incorporated by reference, in its entirety, into the present application.

BACKGROUND OF THE INVENTION

1. Field of the Invention

One embodiment of the present invention relates to a video creation method of creating a video file by capturing a video using an imaging apparatus.

2. Description of the Related Art

In a case in which a video of each of a plurality of subjects is acquired in a certain scene, the video of the scene may be captured by one imaging apparatus to extract the video of each subject from the captured video. Examples of such a technique include the techniques disclosed in JP1999-220653A (JP-H11-220653A), JP2004-194309A, and JP2014-42357A.

JP1999-220653A (JP-H11-220653A) discloses a technique of cutting out a part of an original image captured by one camera to generate a cut-out image, controlling a cut-out position, and outputting the cut-out image such that a position of a subject is changed.

JP2004-194309A discloses a technique of detecting a plurality of objects based on a high-resolution wide-angle video captured by one camera, cutting out a video of each detected object from the wide-angle video, and displaying the videos of the plurality of objects on a monitor in parallel.

JP2014-42357A discloses a technique of designating a plurality of any areas from a video captured by one imaging apparatus, cutting out videos corresponding to the designated plurality of any areas, and outputting the cut-out videos.

SUMMARY OF THE INVENTION

In a case in which a part of the video is extracted, an image quality of the extracted video is determined in accordance with conditions, such as an exposure amount at the time of imaging, white balance, and lens focus. In a case in which these conditions are set to appropriate values, the extracted video has a good image quality.

On the other hand, the appropriate conditions for the extracted video are determined in accordance with a position of the extracted region in an original video. In consideration of the above, it is required to secure a good image quality of the extracted video even in a case in which the position of the extracted region is changed.

However, the techniques disclosed in JP1999-220653A (JP-H11-220653A), JP2004-194309A, and JP2014-42357A do not optimize the conditions, such as the exposure amount, the white balance, and the lens focus, in accordance with the position of the extracted video. Therefore, even in a case in which the techniques disclosed in JP1999-220653A (JP-H11-220653A), JP2004-194309A, and JP2014-42357A are used, there is a risk that the image quality of the extracted video, particularly the image quality in a case in which the position of the extracted region is changed, cannot be appropriately secured.

One embodiment of the present invention has been made in view of the above circumstances, and is to provide a video creation method capable of obtaining a good image quality of a video obtained by extracting a part of captured video even in a case in which a position of the extracted region is changed.

In order to achieve the above object, an aspect of the present invention relates to a video creation method of creating a video file based on a video captured by an imaging apparatus including an imaging lens and an imaging element, the method comprising a setting step of setting, in an imaging region of a first video having a first angle of view, a plurality of regions having a second angle of view smaller than the first angle of view, a designation step of designating, out of a first region and a second region included in the plurality of regions, the second region having a smaller appropriate exposure amount than the first region as a reference region, and a condition determination step of determining at least one condition of an exposure time in a case in which the first video is captured or a stop amount for an incidence ray on the imaging lens based on the appropriate exposure amount of the reference region.

In addition, the video creation method according to the aspect of the present invention may further comprise a selection step of selecting a selection region which is an imaging region of a recorded video from among the plurality of regions, a switching step of reselecting the selection region from among the plurality of regions to switch the selection region after the selection step, and a creation step of recording each of a video of the selection region before the switching step and a video of the selection region after the switching step to create the video file.

In addition, in the video creation method according to the aspect of the present invention, in the creation step, the video of the selection region before the switching step and the video of the selection region after the switching step may be combined to create a motion picture file as the video file. In this case, it is possible to acquire the motion picture file of the video in which a good image quality is maintained before and after the switching step.

In addition, it is preferable that the designation step be executed in a case in which the switching step is executed, and the condition determination step be executed each time the designation step is executed.

In addition, the video creation method according to the aspect of the present invention may further comprise a sensitivity determination step of determining sensitivity of a pixel among a plurality of pixels included in the imaging element corresponding to the first region based on the appropriate exposure amount of the first region and the condition determined in the condition determination step in a case in which the first region is selected as the selection region.

It should be noted that it is preferable that, in the sensitivity determination step, the sensitivity of the pixel corresponding to the first region be determined to be higher than sensitivity of the pixel corresponding to the second region which is the reference region.

In addition, the video creation method according to the aspect of the present invention may further comprise an adjustment step of chronologically adjusting an exposure amount in a case in which the first video is captured by chronologically changing the condition. In this case, the condition determination step may include a first determination step of determining the condition based on the appropriate exposure amount of the reference region, and a second determination step of determining an adjustment amount of the exposure amount in the adjustment step based on the appropriate exposure amount of the selection region. In addition, the adjustment step may be executed based on the condition determined in the first determination step and the adjustment amount determined in the second determination step.

It should be noted that it is preferable that the first determination step be executed in a case in which the switching step is executed, and the second determination step be executed in the adjustment step after the first determination step is executed.

In addition, the video creation method according to the aspect of the present invention may further comprise a display step of displaying the first video on a display screen. In this case, in the setting step, the plurality of regions may be set in accordance with a setting operation executed by a user through the first video displayed on the display screen.

In addition, another aspect of the present invention relates to a video creation method of creating a video file based on a video captured by an imaging apparatus including an imaging lens and an imaging element, the method comprising a setting step of setting, in an imaging region of a first video having a first angle of view, a plurality of regions having a second angle of view smaller than the first angle of view, a selection step of selecting a selection region which is an imaging region of a recorded video from among the plurality of regions, a switching step of reselecting the selection region from among the plurality of regions to switch the selection region after the selection step, a first recording step of recording a video of the selection region in a first period, in which the first recording step is executed between a time when the switching step is executed and a time when the first period elapses, a second recording step of recording a video of the selection region in a second period other than the first period, in which the second recording step is executed the second period, and an adjustment step of adjusting at least one condition of an exposure amount of the selection region, white balance of the video of the selection region, or focus of the imaging lens in each of the first period and the second period, in which, in the adjustment step executed in the first period, an adjustment speed of the condition is faster than in the adjustment step executed in the second period.

In addition, in the video creation method according to the aspect of the present invention, it is more preferable that, in the adjustment step, a stop driving unit that changes a stop amount for an incidence ray on the imaging lens be driven to adjust the exposure amount, and in the adjustment step executed in the first period, a drive speed of the stop driving unit be faster than in the adjustment step executed in the second period.

In addition, in the video creation method according to the aspect of the present invention, it is more preferable that, in the adjustment step, an optical component for focus of the imaging lens be moved to adjust the focus, and in the adjustment step executed in the first period, a movement speed of the optical component for focus be faster than in the adjustment step executed in the second period.

In addition, still another aspect of the present invention relates to a video creation method of creating a video file based on a video captured by an imaging apparatus including an imaging lens and an imaging element, the method comprising a setting step of setting, in an imaging region of a first video having a first angle of view, a plurality of regions having a second angle of view smaller than the first angle of view, a selection step of selecting a selection region which is an imaging region of a recorded video from among the plurality of regions, a switching step of reselecting the selection region to switch the selection region from among the plurality of regions after the selection step, a first recording step of recording a video of the selection region in a first period, in which the first recording step is executed between a time when the switching step is executed and a time when the first period elapses, a second recording step of recording a video of the selection region in a second period other than the first period, in which the second recording step is executed the second period, a first adjustment step of adjusting an exposure amount of the selection region to a target exposure amount using first adjustment data, in which the first adjustment step is executed in the first period, and a second adjustment step of adjusting the exposure amount of the selection region to the target exposure amount using second adjustment data, in which the second adjustment step is executed in the second period, in which, in the first adjustment step and the second adjustment step, a value of each of a plurality of parameters including an exposure time, sensitivity of a pixel included in the imaging element, and a stop amount for an incidence ray on the imaging lens is determined based on the first adjustment data or the second adjustment data to adjust the exposure amount to the target exposure amount, and the value of each of the plurality of parameters determined for the target exposure amount varies between the first adjustment data and the second adjustment data.

In addition, in the video creation method according to the aspect of the present invention, in the first adjustment data and the second adjustment data, a change pattern may be determined in a case in which the value of each of the plurality of parameters is changed to adjust the exposure amount to the target exposure amount. In this case, it is preferable that, in the first adjustment data, the change pattern having a smaller change degree of the stop amount for the target exposure amount than the change pattern of the second adjustment data be determined.

In addition, in the video creation method according to the aspect of the present invention, the imaging apparatus may include an electronic dimming filter capable of changing a dimming degree by an electronic method. In addition, the plurality of parameters may include the dimming degree of the electronic dimming filter.

BRIEF DESCRIPTION OF THE DRAWINGS

FIG. 4 is a diagram showing a correspondence relationship between pixels of the imaging element and an imaging region of a first video.

FIG. 18 is a diagram showing an example of a change pattern determined by adjustment data.

DESCRIPTION OF THE PREFERRED EMBODIMENTS

In the following, preferred embodiments (first to sixth embodiments) of the present invention will be described in detail referring to the accompanying drawings.

It should be noted that the embodiments described below are merely examples for ease of understanding of one embodiment of the present invention, and are not intended to limit the present invention. That is, one embodiment of the present invention can be changed or modified from the embodiments described below without departing from the spirit of the present invention. In addition, one embodiment of the present invention includes an equivalent thereof.

First Embodiment

Figure 1:
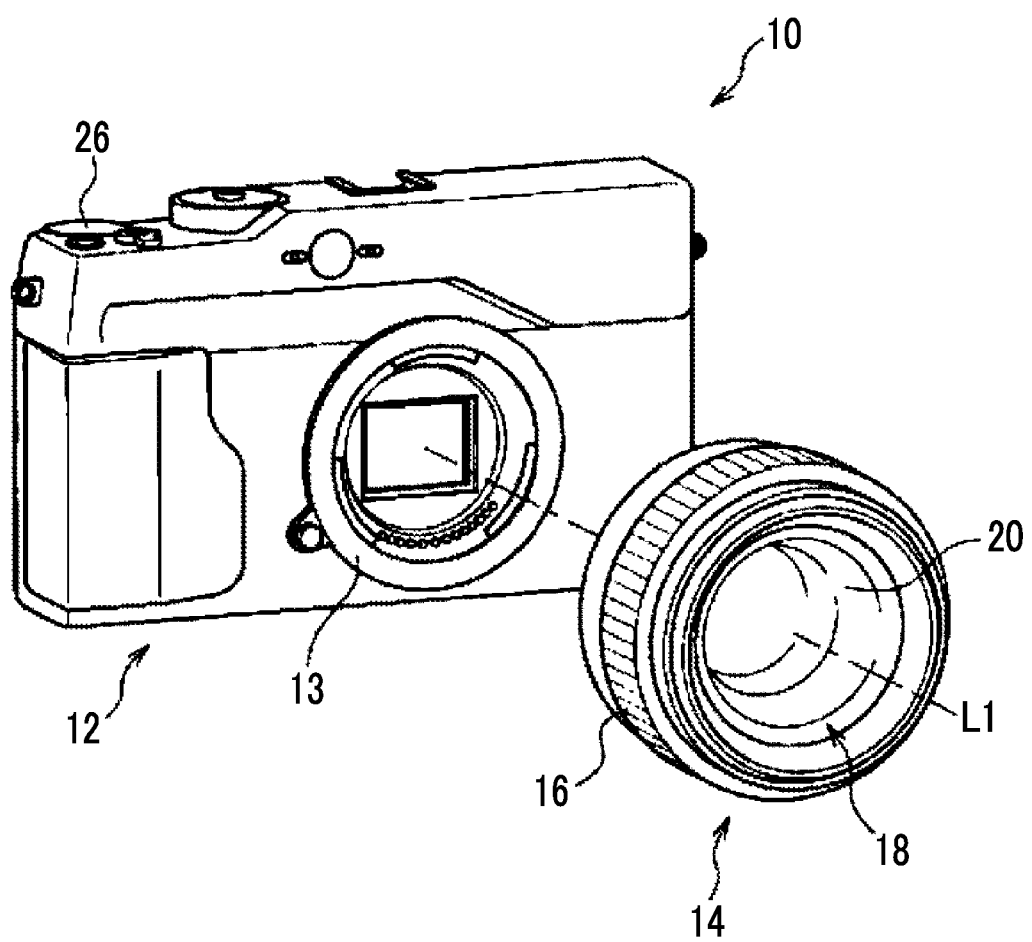
FIG. 1 is a perspective view showing an example of an appearance of an imaging apparatus according to a first embodiment which is one embodiment of the present invention.
Figure 2:
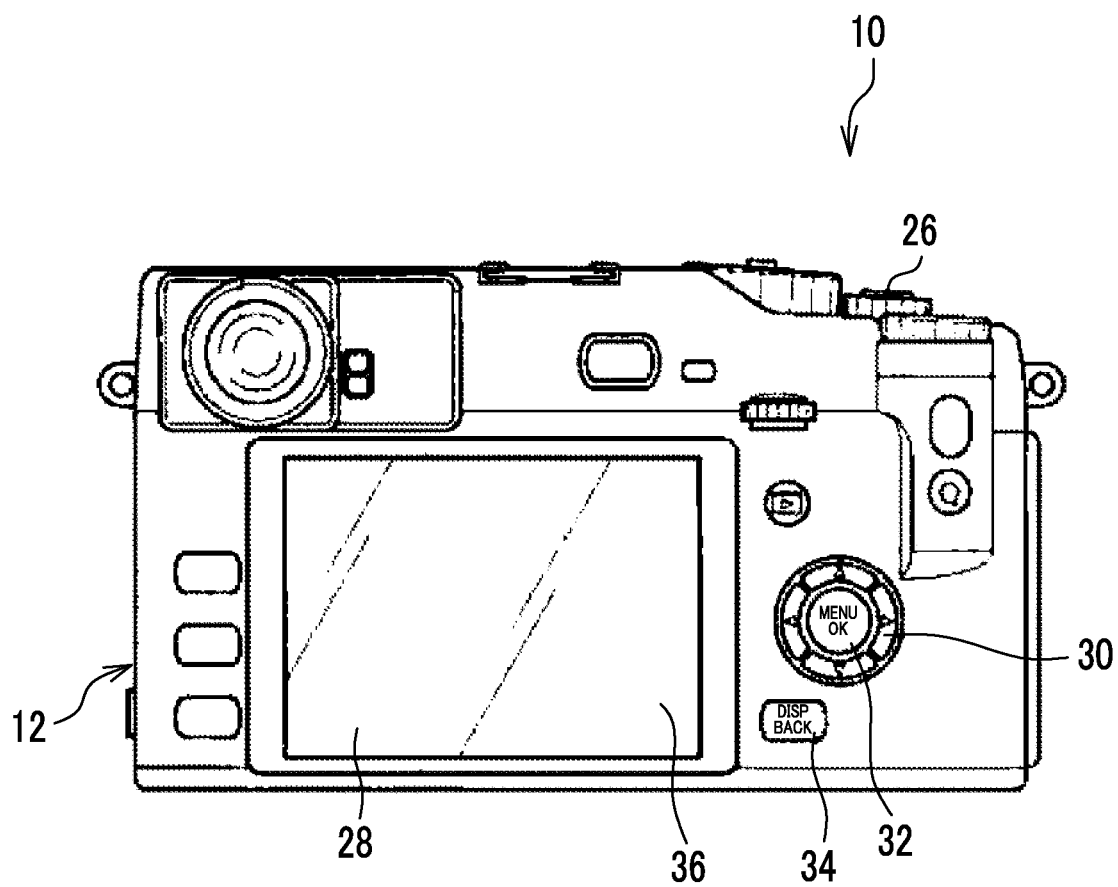
FIG. 2 is a rear view showing a rear side of the imaging apparatus according to the first embodiment which is one embodiment of the present invention.
Figure 3:
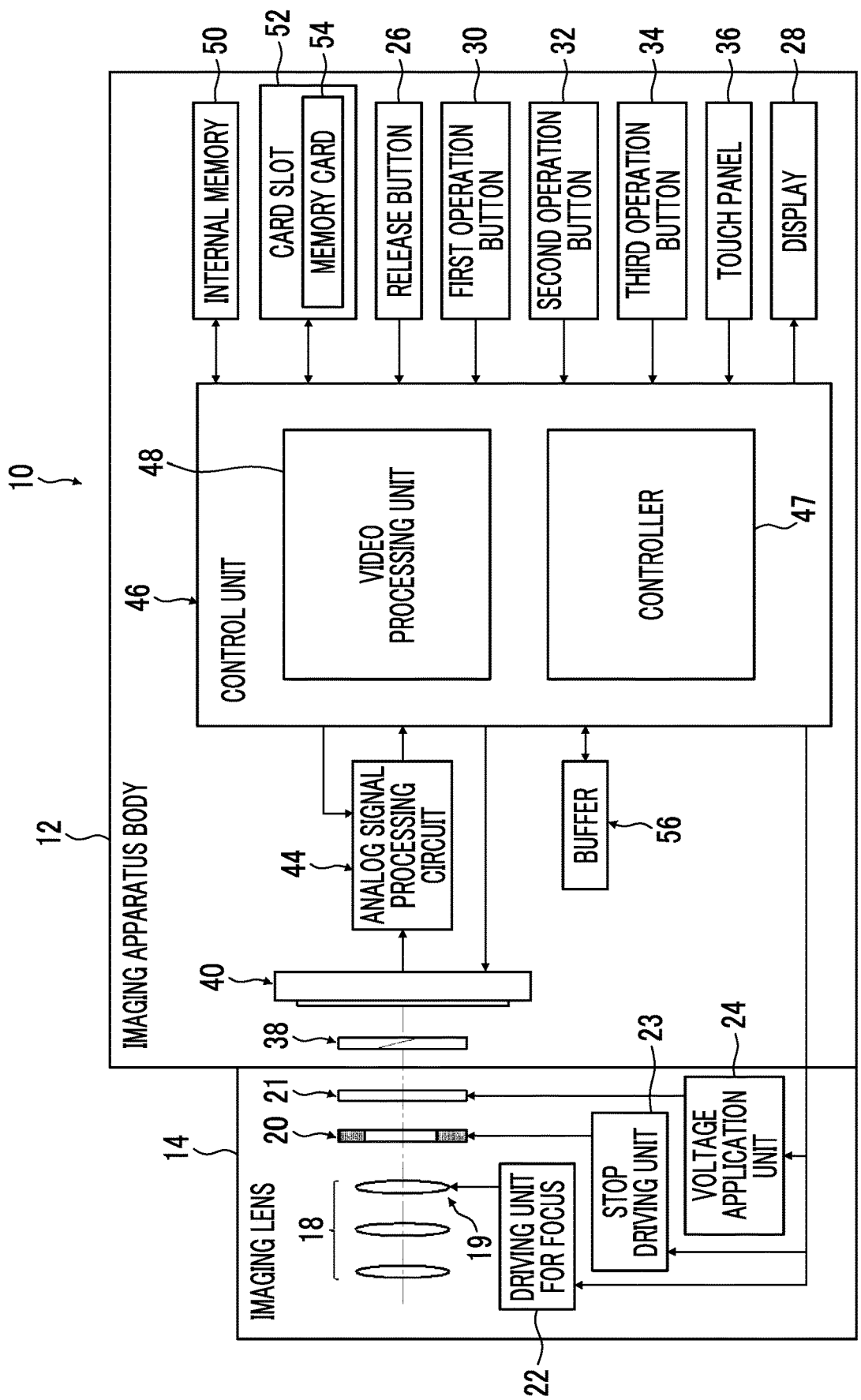
FIG. 3 is a block diagram showing a configuration of the imaging apparatus according to the first embodiment which is one embodiment of the present invention.

The first embodiment, which is one embodiment of the present invention, relates to a video creation method using an imaging apparatus 10 shown in FIGS. 1 to 3. FIGS. 1 and 2 show the appearance of the imaging apparatus 10, FIG. 1 is a perspective view of the imaging apparatus 10, and FIG. 2 is a rear view of the imaging apparatus 10 as viewed from the rear side. FIG. 3 is a block diagram showing a configuration of the imaging apparatus 10.

[Basic Configuration of Imaging Apparatus]

The imaging apparatus 10 is, for example, a digital camera and is used for video capturing. In the following description, the "video" means a live video (live view image), that is, a video captured in real time, unless otherwise specified.

The imaging apparatus 10 shown in FIGS. 1 and 2 is a lens-interchangeable digital camera, and comprises an imaging apparatus body 12 and an imaging lens 14. The imaging lens 14 is interchangeably attached to a mount 13 of the imaging apparatus body 12. It should be noted that the present invention is not limited to this, and the imaging apparatus 10 may be a lens-integrated digital camera.

(Imaging Lens)

As shown in FIG. 3, the imaging lens 14 includes an optical component unit 18, a stop 20, an electronic dimming filter 21, a driving unit for focus 22, a stop driving unit 23, and a voltage application unit 24.

The optical component unit 18 has a plurality of lenses, including an optical component for focus 19 (focus lens). In a case in which the optical component for focus 19 is moved in a direction of an optical axis L1, the focus of the imaging lens 14 is changed.

A focus adjustment mode includes a manual focus mode and an autofocus mode. In the manual focus mode, the optical component for focus 19 is moved in the direction of the optical axis L1 by a user manually turning a focus ring 16 provided on a lens barrel of the imaging lens 14.

In the autofocus mode, a control unit 46 drives the driving unit for focus 22 to move the optical component for focus 19 in the direction of the optical axis L1, so that the focus is automatically adjusted such that a subject in the video is focused. It should be noted that the focus adjustment in the autofocus mode is executed by, for example, the user half-pressing a release button 26 of the imaging apparatus body 12, which is used as a trigger.

A drive motor of the driving unit for focus 22 is composed of an ultrasound motor or the like, and is provided in the imaging apparatus body 12 or the imaging lens 14.

The optical component unit 18 includes a wide-angle lens, an ultra-wide-angle lens, a 360-degree lens, an anamorphic lens, or the like. As a result, the imaging apparatus 10 can capture the video with a wide angle of view in a horizontal direction. Here, the maximum angle of view (hereinafter referred to as a first angle of view) in a case in which the imaging apparatus 10 captures the video is determined in accordance with the use of the optical component unit 18 and an imaging element 40, which will be described below, and the video captured at the first angle of view corresponds to a "first video" in one embodiment of the present invention.

It should be noted that the imaging apparatus 10 may comprise a plurality of optical component units 18 having different angles of view.

The stop 20 is an optical component that is disposed in an optical path of the imaging lens 14 and has a variable aperture shape, and adjusts the stop amount (specifically, a stop value or an F-number) for the incidence ray on the imaging lens 14. The stop 20 has an aperture shape that can be changed, for example, by mechanically driving a member for changing the size of the aperture. It should be noted that the present invention is not limited to this, and a stop (physical characteristic stop) in which the aperture shape can be changed by driving a liquid crystal display or an electrochromic element may be used.

The aperture shape of the stop 20, that is, the stop amount is adjusted by the stop driving unit 23.

The electronic dimming filter 21 is a neutral density (ND) filter that is disposed in the optical path of the imaging lens 14 and can change a dimming degree by an electronic method. The electronic dimming filter 21 is composed of, for example, a liquid crystal mixed with a dimming material that absorbs light, and changes the inclination of liquid crystal molecules to control the dimming degree (specifically, light transmittance).

It should be noted that the electronic dimming filter 21 is not limited to the liquid crystal type electronic ND filter, and may be a precipitation type electronic ND filter that uses an oxidation-reduction reaction of a reactant (for example, silver chloride). In addition, as the electronic dimming filter 21, for example, the electronic ND filter disclosed in JP2013-88596A or JP2019-68402A can be used.

The dimming degree of the electronic dimming filter 21 is adjusted by changing the magnitude of the voltage (applied voltage) applied to the electronic dimming filter 21 by the voltage application unit 24.

(Imaging Apparatus Body)

As shown in FIGS. 1 and 2, the imaging apparatus body 12 comprises an operating part operated by the user. For example, the release button 26 is disposed on an upper surface of the imaging apparatus body 12. For example, in a case in which the user fully presses the release button 26, the recording of the video captured by the imaging apparatus 10 or the video based on the captured video is started. Examples of the video based on the captured video include a video of a selection region, which will be described below. It should be noted that a release instruction (that is, a recording instruction) of the user may be input to the control unit 46 via a touch operation detection function of a display 28.

The display 28 constituting a display screen is disposed on the rear surface of the imaging apparatus body 12, and a plurality of buttons 30, 32, and 34 are disposed around the display 28.

The display 28 is composed of, for example, a liquid crystal display (LCD), an organic electroluminescence (EL) display, a light emitting diode (LED) display, or an electronic paper. On the display screen of the display 28, the video captured by the imaging apparatus 10 or the video based on the captured video is displayed.

In addition, on the display screen of the display 28, a selection menu relating to imaging conditions and the like, notification information to the user including warnings and the like, and a reproduced video of the video acquired in the past are further displayed.

The display 28 has a function of detecting the touch operation of a user's finger. In addition, a transmissive touch panel 36 is superimposed on the display 28 or incorporated inside the display 28. The touch panel 36 detects a contact position of the user's finger or stylus pen and its displacement, and outputs a signal based on the detection result to a predetermined output destination. For example, the user touches the touch panel 36 with two fingers close to each other and then executes an operation of widening a distance between the fingers (so-called pinch-out operation). In this case, the touch panel 36 detects the positions of each of the two fingers at an operation start time and an operation termination time, and outputs a signal based on the detection result.

As shown in FIG. 3, a shutter 38, an imaging element 40, an analog signal processing circuit 44, the control unit 46, an internal memory 50, a card slot 52, and a buffer 56 are provided in a housing of the imaging apparatus body 12.

The imaging element 40 is an image sensor, and is composed of a solid-state imaging element such as a charged coupled device (CCD) or a complementary metal oxide semiconductor imaging sensor (CMOS). The imaging element 40 has a plurality of pixels 42 arranged in a grid pattern as shown in FIG. 4. FIG. 4 shows a correspondence relationship between the pixels 42 of the imaging element 40 and the imaging region of the first video.

Each pixel 42 includes an on-chip microlens, a color filter, and a photodiode (photoelectric conversion element).

In addition, each pixel 42 corresponds to one of unit regions A0 constituting an imaging region A1 of the video as shown in FIG. 4. The imaging region A1 is an imaging region in a case in which the imaging apparatus 10 captures the first video, and an angle of view thereof corresponds to the first angle of view. The unit region A0 is a region forming the minimum unit in the imaging region A1 and is a region corresponding to the pixels 42 arranged in a vertical direction and the horizontal direction of the imaging element 40.

Stated another way, the first video reflected in the imaging region A1 is composed of the same number of unit videos as the number of unit regions A0 (that is, the number of pixels 42). It should be noted that, in the present specification, the number of unit videos in the first video is referred to as "the number of pixels" for convenience.

The imaging element 40 receives light from the subject which passes through the imaging lens 14, converts a received light image into an electric signal (image signal), and outputs the converted electric signal. In addition, the imaging element 40 is configured to execute an exposure operation using a so-called electronic shutter.

It should be noted that, in the following description, "exposure" means that the imaging element 40 executes exposure with the electronic shutter while the shutter 38 is maintained in an opened state, unless otherwise specified. In addition, the "exposure time" means a time corresponding to a shutter speed of the electronic shutter, strictly speaking, a charge accumulation time.

In the configuration shown in FIG. 3, the analog signal processing circuit 44 reads out the electric signal (image signal) for one frame output from the imaging element 40 for each pixel. The analog signal processing circuit 44 amplifies the read out image signal by an auto gain controller (AGC), and executes signal processing, such as sampling two correlation pile processing, on the amplified signal. The processed signal is transmitted to a video processing unit 48 of the control unit 46.

The control unit 46 controls each unit of the imaging apparatus 10 and executes various processes relating to the creation of the video file. As shown in FIG. 3, the control unit 46 includes a controller 47 and a video processing unit 48.

The control unit 46 is composed of, for example, one or a plurality of processors, and is composed of, for example, a central processing unit (CPU) and a control program. It should be noted that the present invention is not limited to this, and the processor described above may be composed of a field programmable gate array (FPGA), a digital signal processor (DSP), an application specific integrated circuit (ASIC), a graphics processing unit (GPU), a micro-processing unit (MPU), or other integrated circuits (ICs) or configured by combining these.

In addition, the processor described above may configure all functions of the control unit 46 including the controller 47 and the video processing unit 48 with one integrated circuit (IC) chip, as represented by system on chip (SoC).

It should be noted that the hardware configuration of the processor described above may be realized by an electric circuit (circuitry), in which circuit elements, such as semiconductor elements, are combined.

The controller 47 comprehensively controls the imaging apparatus 10 in accordance with the operation of the user or a defined control pattern. For example, the controller 47 controls the imaging element 40 and the analog signal processing circuit 44 to capture the video (motion picture) at a predetermined frame rate.

In addition, the controller 47 determines the imaging conditions in accordance with the imaging environment, and controls each driving unit, the imaging element 40, the analog signal processing circuit 44, and the video processing unit 48 such that the conditions become the determined imaging conditions. The imaging conditions include the exposure amount in a case in which the video is captured, the white balance, the focus of the imaging lens 14, and the like.

Further, the controller 47 controls the video processing unit 48 such that the captured video or the video based on the captured video is recorded on a recording medium.

The video processing unit 48 converts the signal transmitted from the analog signal processing circuit 44 into digital image data, and then executes various processes, such as gamma correction, white balance correction, and scratch correction, on the digital image data. In addition, the video processing unit 48 compresses the processed digital image data in a compression format conforming to a predetermined standard.

Moreover, the video processing unit 48 generates the compressed digital image data at a specific frame rate while capturing the video, and acquires the video (strictly speaking, frame image) from the data. The video (frame image) acquired in this case corresponds to the video captured at the first angle of view, that is, the first video.

In addition, the video processing unit 48 executes various processes (for example, extraction process which will be described below) on the acquired video under the control of the controller 47, and outputs the processed video at a specific frame rate for each frame to the display 28.

Further, the video processing unit 48 records the processed video on the recording medium and creates the video file. As described above, the video processing unit 48 has a function of creating the video file, and the imaging apparatus 10 including the video processing unit 48 is used as a video creation apparatus.

It should be noted that, in the following, unless otherwise specified, the operation and process of each of the controller 47 and the video processing unit 48 will be described as the operation and process of the control unit 46. In addition, the process by the control unit 46 will be described below in detail.

The internal memory 50 built in the imaging apparatus body 12 and a memory card 54 that can be attached to and detached from the imaging apparatus body 12 via the card slot 52 are recording media, and the video is recorded on the recording medium by the control unit 46. The internal memory 50 and the memory card 54 are composed of a flash memory, a ferro electric memory, or the like. It should be noted that the internal memory 50 and the memory card 54 may be outside the imaging apparatus body 12, and in that case, the control unit 46 may record the video on an external recording medium by wire or wirelessly.

The buffer 56 functions as a work memory of the control unit 46, and is composed of, for example, a dynamic random access memory (DRAM), a ferroelectric memory, or the like.

[Process by Control Unit]

The process by the control unit 46 includes a display process, an extraction process, a selection process, a switching process, a recording process, an exposure amount adjustment process, a focus adjustment process, and a white balance adjustment process.

In the following, each of the processes described above will be described individually.

(Display Process)

The display process is a process of displaying various videos on the display screen of the display 28. For example, in a case in which the control unit 46 starts the display process after the imaging apparatus 10 is activated, at that time, the first video captured by the imaging apparatus 10 at the first angle of view, that is, the video reflected in the imaging region A1 shown in FIG. 4 is displayed.

In addition, in a case in which the extraction process is executed, the control unit 46 displays the video of the selection region, which will be described below, on the display screen in the display process. Further, in a case in which the selection region is switched (that is, in a case in which a switching step, which will be described below, is executed), the control unit 46 switches the video displayed on the display screen to the video of the selection region after the switching step.

The execution operation of the display process by the control unit 46 as described above corresponds to a display step. It should be noted that, in the present embodiment, the video displayed on the display 28 by the display process is a live video (live view image) captured in real time at that time.

(Extraction Process)

The extraction process is a process of extracting a part of the first video. The extracted video is also called a crop video (cut-out video) and is a recording target in the recording process.

Figure 5:
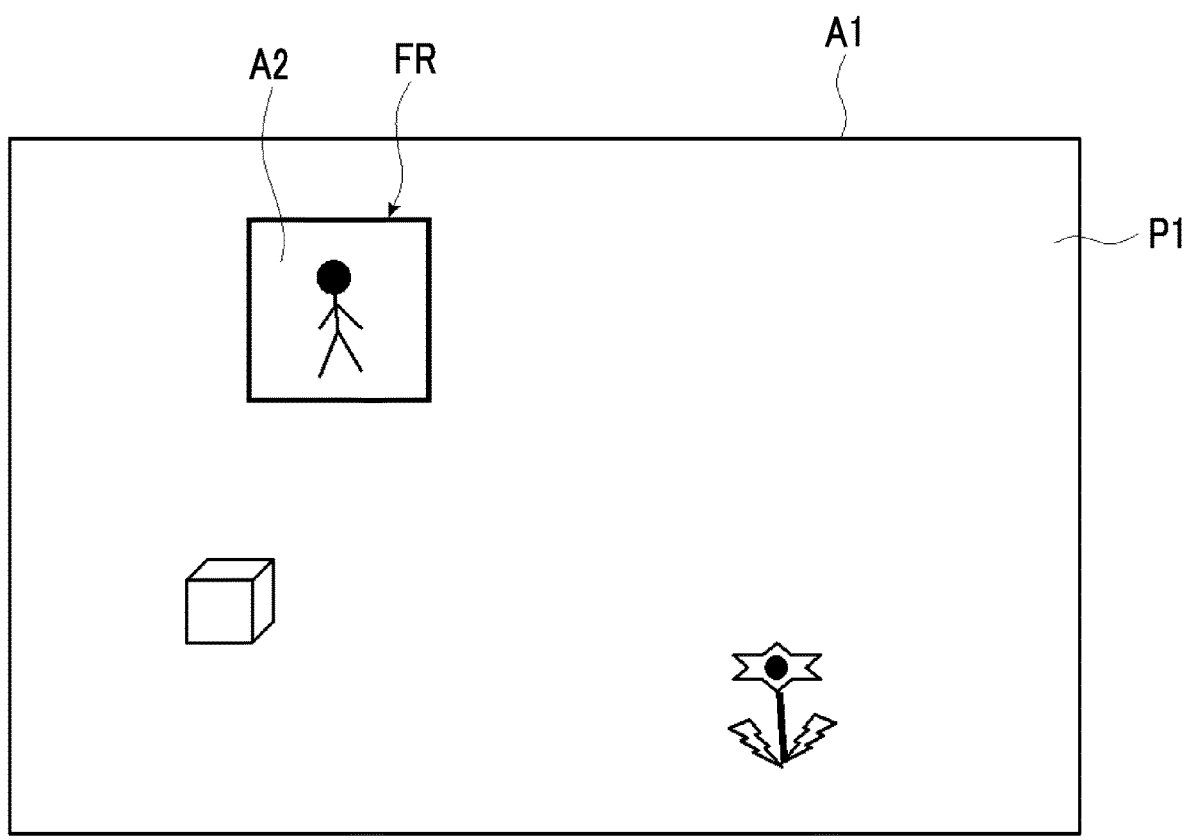
FIG. 5 is a diagram showing a procedure of setting a region of a video extracted from the first video.

In the extraction process, the user executes an operation for setting the region to be extracted in the imaging region of the first video. The setting operation will be specifically described with reference to FIG. 5. FIG. 5 shows a procedure of setting the region of the video extracted from the first video.

As shown in FIG. 5, the user executes the setting operation in a state in which the first video (denoted as the symbol P1 in FIG. 5) is displayed on the display screen of the display 28. Specifically, in a case in which the user executes a predetermined button operation while the first video P1 is displayed, a rectangular region setting frame FR is superimposed and displayed on the first video P1 as shown in FIG. 5. A region A2 surrounded by the region setting frame FR is the region of the video extracted from the first video P1. The angle of view of the extracted video is smaller than the angle of view of the first video P1, that is, the first angle of view, and is hereinafter referred to as a second angle of view.

The region setting frame FR is displayed in a state in which its position, size, and aspect ratio are variable. For example, the user touches one side of the region setting frame FR on the touch panel 36 with a finger and drags the finger to change a display position of the region setting frame FR. In addition, the size and aspect ratio of the region setting frame FR can be changed by the user touching the region setting frame FR on the touch panel 36 with two fingers and widening or narrowing the distance between the fingers. By changing the position, size, and aspect ratio of the region setting frame FR in this way, the position, size, and aspect ratio of the region of the video extracted from the first video P1 can be changed.

The operation described above corresponds to the setting operation by the user. In addition, by repeating a series of operations described above a plurality of times, as shown in FIG. 6, a plurality of regions A2 of the extracted video can be set in the imaging region A1 of one first video P1. FIG.

6 shows a state in which the plurality of regions A2 of the video extracted from the first video P1 are set.

It should be noted that, in a case in which the plurality of regions A2 are set, the size (second angle of view) of each region A2 may be the same as other regions A2 or may vary between the regions A2.

In addition, the shape of each region A2 is not limited to a rectangle (rectangle), and may be a square, a parallelogram, a trapezoid, a rhombus, a circle or an ellipse, a polygon of a triangle or a pentagon or more, or an indefinite shape.

Figure 6:
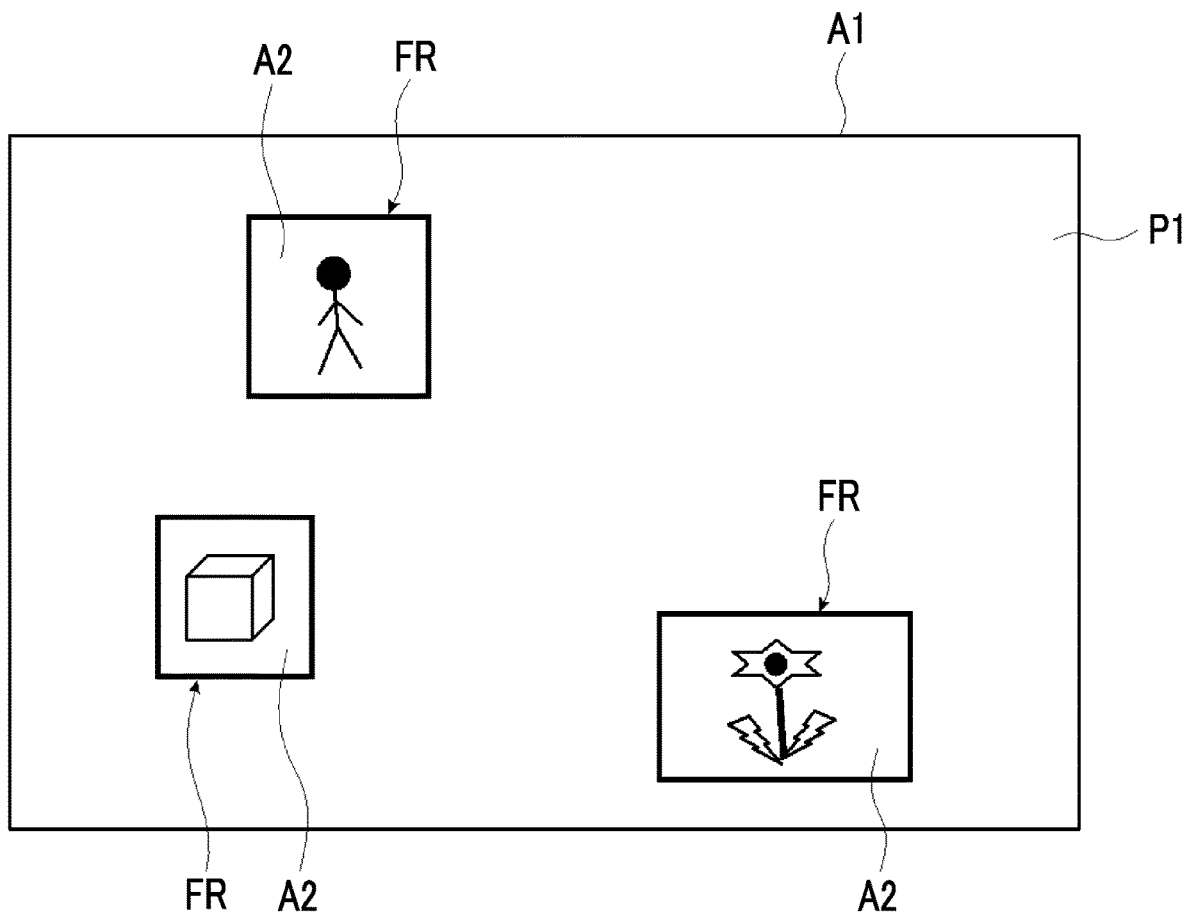
FIG. 6 is a diagram showing a state in which a plurality of regions of the video extracted from the first video are set.

In addition, the number of regions A2 to be set is not particularly limited, but in the present embodiment, the number of regions A2 is two or more as shown in FIG. 6.

In a case in which the setting operation by the user is repeated a plurality of times, the control unit 46 receives each setting operation and sets the regions A2 corresponding to the number of setting operations in the imaging region A1 of the first video P1. Such an operation of the control unit 46 corresponds to a setting step.

It should be noted that, in a case in which the first video P1 is a high-quality video (for example, a video having 10 million or more pixels), the video of the second angle of view extracted from the first video P1 is a sufficiently high-quality video.

The number of pixels of the first video P1 is not particularly limited, but a lower limit thereof is preferably 10 million or more, and more preferably 60 million or more. In addition, an upper limit of the number of pixels is preferably 1 billion or less, and more preferably 500 million or less. In a case in which the number of pixels exceeds the lower limit described above, the visibility of the video of the second angle of view extracted from the first video P1 is guaranteed. In a case in which the number of pixels is less than the upper limit described above, the amount of data in the first video P1 is reduced, and a process speed by the control unit 46 is increased.

(Selection Process and Switching Process)

The selection process is a process of selecting the selection region in which the recorded video is reflected from among the plurality of regions A2 set in the imaging region A1 of the first video P1.

The switching process is a process of reselecting the selection region from among the plurality of regions A2 to switch the selection region after the selection process.

It should be noted that, in the present embodiment, the number of regions to be selected in the selection process and the switching process is one, but the number of regions is not limited to this, and two or more regions may be selection regions.

The procedure of the selection process and the switching process will be described. The user executes the setting operation described above to set the plurality of regions A2, and then selects any of the regions A2 as the selection region. Thereafter, the region A2 selected by the user through the operation buttons 30, 32, and 34, the touch panel 36, or the like is input, and the input operation is received by the control unit 46. The control unit 46 determines the selection region from among the plurality of regions A2 based on the input operation of the user. Such an operation by the control unit 46 corresponds to a selection step.

In addition, after the selection step, in a case in which the user reselects the selection region to another region A2 and executes the input operation again, the control unit 46 receives a re-input operation and switches the selection region up to the current time to another region A2 based on the re-input operation. Such an operation by the control unit 46 corresponds to a switching step.

It should be noted that the input operation (re-input operation) executed in a case in which the user reselects the selection region is not particularly limited. For example, the re-input operation may be an operation of tapping the region A2 to be selected on the display 28, or may be an operation of pressing down any of an up/down button or a right/left button of the first operation button 30 which is a cross key.

Figure 7:
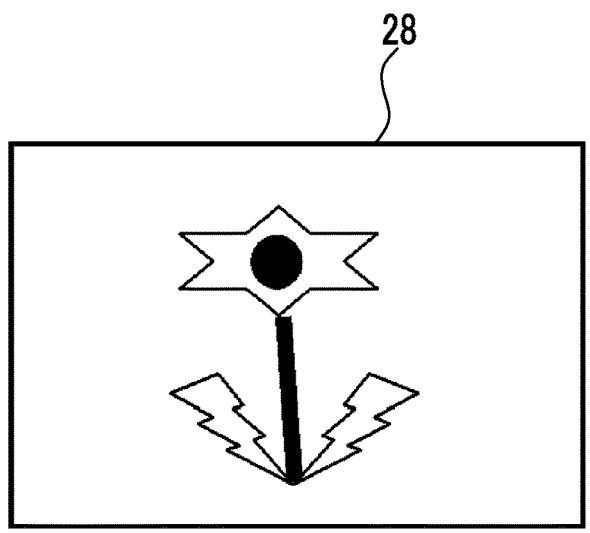
FIG. 7 is a diagram showing a video of a selection region displayed on a display screen.

As described above, in the present embodiment, the selection region is selected from among the plurality of regions A2 in the selection step, and the video of the selection region is recorded as the video file. In addition, in a case in which the selection step is executed, the video of the selection region is displayed on the display screen of the display 28 as shown in FIG. 7 in conjunction with the selection step. FIG. 7 shows the video of the selection region displayed on the display screen.

In addition, by executing the switching step after the selection step, the selection region can be switched and the video which is the recording target can be changed from the video of a certain subject to the video of another subject. As a result, for each of a plurality of subjects in the same scene (same place), individual videos (specifically, videos close up to each subject) can be simultaneously captured by one imaging apparatus 10 without using a plurality of apparatuses.

In addition, the region A2 in which the recorded video is reflected can be switched (switched) in time series in accordance with the operation of the user, and the video file in which the video before and after the switching is reflected can be easily acquired.

Further, in conjunction with the execution of the switching step, the video displayed on the display screen of the display 28 is switched from the video of the selection region before the switching step to the video of the selection region after the switching step. As a result, the user can confirm the switching of the selection region on the display screen.

(Recording Process)

The recording process is a process in which the control unit 46 records the video of the selection region on the recording medium to create the video file (specifically, motion picture file) relating to the video. The operation of the control unit 46 to record the video of the selection region in the recording process corresponds to a recording step. In addition, the operation of the control unit 46 to create the video file in the recording process corresponds to a creation step.

It should be noted that, in the present embodiment, recording the video and creating the video file are synonymous, and the creation step corresponds to the recording step.

Figure 8:
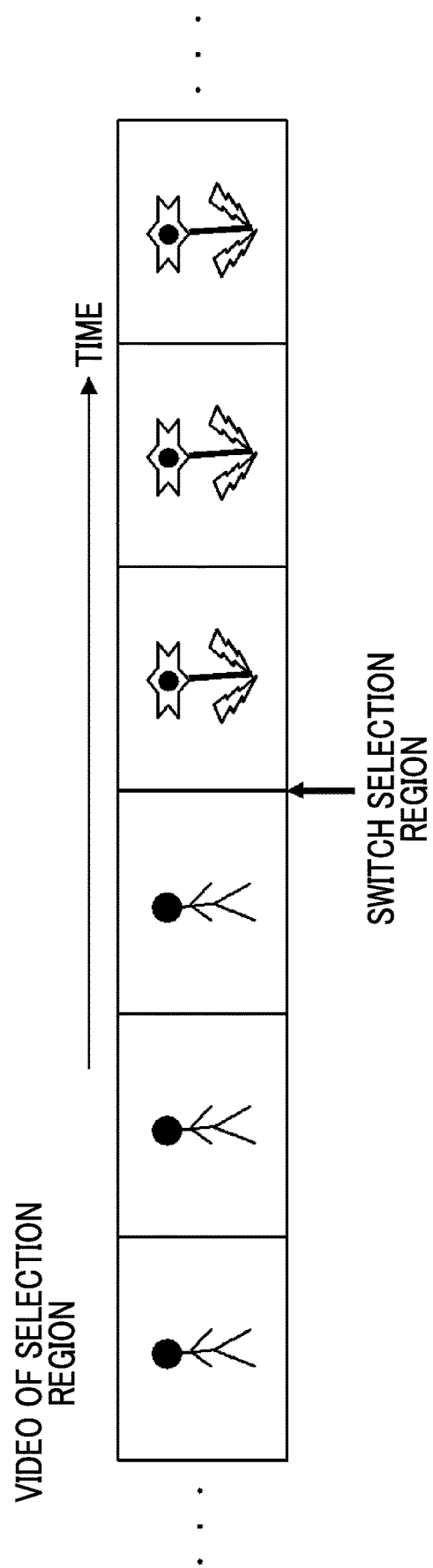
FIG. 8 is an explanatory diagram of a motion picture file of a recorded video.

In addition, in a case in which the switching step is executed, the control unit 46 records each of the video of the selection region before the switching step and the video of the selection region after the switching step to create the video file. Specifically, in the creation step, the control unit 46 combines the video (motion picture) of the selection region before the switching step and the video (motion picture) of the selection region after the switching step to create the motion picture file as the video file. As a result, as shown in FIG. 8, the motion picture file of the video in which the subject is changed by switching the selection region is acquired. FIG. 8 is an explanatory diagram of the motion picture file of the recorded video.

(Exposure Amount Adjustment Process)

The exposure amount adjustment process is a process of adjusting the exposure amount of the selection region, and is executed by using an automatic exposure (AE) function of the control unit 46.

The exposure amount is determined by a plurality of parameters including the exposure time (that is, the shutter speed of the electronic shutter), the sensitivity (ISO sensitivity) of the pixel 42 included in the imaging element 40, and the stop amount (F-number) of the incidence ray on the imaging lens 14. The exposure amount is adjusted by determining the value of each parameter and controlling the stop driving unit 23, the imaging element 40, the video processing unit 48, and the like such that each parameter becomes the determined value. Here, the adjustment of the stop 20 by the stop driving unit 23 is executed by using a known automatic light control (ALC) function. In addition, the adjustment of the shutter speed of the electronic shutter in the imaging element 40 is executed by using a known electronic light control (ELC) function.

In a case in which the imaging lens 14 includes the electronic dimming filter 21, the dimming degree of the electronic dimming filter 21 is included in the plurality of parameters. In this case, the exposure amount is adjusted by determining the value of the dimming degree of the electronic dimming filter 21 and controlling the voltage application unit 24 such that the dimming degree becomes the determined value.

By the way, an appropriate value (appropriate exposure amount) of the exposure amount of the selection region is changed in accordance with the region, which is the selection region among the plurality of regions A2 set in the imaging region A1 of the first video P1.

More specifically, in a case in which the first video P1 is captured, the exposure amount in each portion of the imaging region A1 including the plurality of regions A2 is changed in accordance with the subject and the environment in each portion. That is, since an appropriate exposure amount of each region A2 in the imaging region A1 can be changed in accordance with the position of the region A2, the appropriate exposure amount is determined for each region A2.

The appropriate exposure amount of each region A2 is determined by a known procedure. As an example, from the image signal output from the pixel 42 corresponding to the unit region A0 constituting a certain region A2 in the imaging element 40, the brightness of red (R), green (G), and blue (B) (that is, RGB pixel value) is integrated for the region A2. Here, the pixel 42 corresponding to the unit region A0 is the pixel 42 at the same arrangement position as the unit region A0 in a positional relationship shown in FIG. 4. For example, in FIG. 4, the unit region A0 in the region A2 surrounded by a thick frame corresponds to the pixel 42 in a range surrounded by the thick frame in FIG. 4. Moreover, the appropriate exposure amount in a case in which the video of the region A2 is captured is determined from the integrated value of the RGB pixel values calculated for the region A2 (specifically, average value in the region A2).

The exposure amount of the selection region is adjusted based on the appropriate exposure amount determined as described above. Specifically, the control unit 46 determines the value of each of the exposure time (shutter speed) and the stop amount (F-number) based on the appropriate exposure amount in a predetermined region. Such an operation corresponds to a condition determination step by the control unit 46. The value of each parameter determined in the condition determination step is a value indicating an exposure condition in a case in which the first video including the video of the selection region is captured.

It should be noted that, in the present embodiment, both the exposure time and the stop amount are determined, but the present invention is not limited to this, and only one of the exposure time or the stop amount may be determined.

In addition, the control unit 46 determines the value of each of the exposure time and the stop amount, and then determines the value of the sensitivity (ISO sensitivity) of the pixel 42 corresponding to the selection region in accordance with the combination of these values. Strictly speaking, the gain (amplification ratio) for the output signal from the pixel 42 corresponding to the selection region is determined. Such an operation corresponds to a sensitivity determination step by the control unit 46.

It should be noted that the gain may be, for example, the analog gain for the analog signal in the analog signal processing circuit 44 or the like, or the digital gain for the signal (data) after digital conversion in the video processing unit 48 or the like.

Moreover, after the exposure time, the stop amount, and the sensitivity are determined, the control unit 46 controls the stop driving unit 23, the imaging element 40, the video processing unit 48, and the like such that these parameters become the determined values.

While the video is recorded, the exposure amount adjustment process is periodically (for example, for each frame) and repeatedly executed by the procedure described above. Moreover, each time the exposure amount adjustment process is executed, the exposure time, the stop amount, and the sensitivity value are determined.

Specifically, while the video is captured, the integrated value of the RGB pixel values in the predetermined region in an Nth frame image (N is a natural number) is obtained. Thereafter, the appropriate exposure amount is calculated based on the obtained integrated value, and the exposure time and the stop amount in a case in which the subsequent (that is, N+1th) frame image is captured are determined based on the calculated appropriate exposure amount.

In addition, the integrated value of the RGB pixel values in the selection region in the Nth frame image is obtained, and the appropriate exposure amount of the selection region is calculated from the obtained integrated value. Moreover, the sensitivity of the pixel 42 corresponding to the selection region in the Nth frame image is determined based on the calculated appropriate exposure amount, and the exposure time and the stop amount at that time.

In addition, in the present embodiment, the exposure time and the stop amount are changed chronologically, and the exposure amount in a case in which the first video is captured is adjusted chronologically accordingly. Further, as a result of chronologically changing the sensitivity of the pixel 42 corresponding to the selection region, the exposure amount of the selection region is adjusted chronologically.

It should be noted that, in the present embodiment, the "chronological adjustment" means that the adjustment amount is determined for each frame for the parameter that is an adjustment target, and each parameter is increased or decreased by the adjustment amount for each frame.

(Focus Adjustment Process)

The focus adjustment process is a process in which the control unit 46 controls the driving unit for focus 22 in the autofocus mode to automatically adjust the focus of the imaging lens 14. A known autofocus technique can be used for the focus adjustment in the autofocus mode.

(White Balance Adjustment Process)

The white balance adjustment process is a process of automatically adjusting the white balance of the video of the selection region by the control unit. The white balance adjustment process is executed using a known auto white balance (AWB) function, for example, a technique disclosed in JP2009-33410A.

Regarding Flow of Video Creation According to First Embodiment

Figure 9:
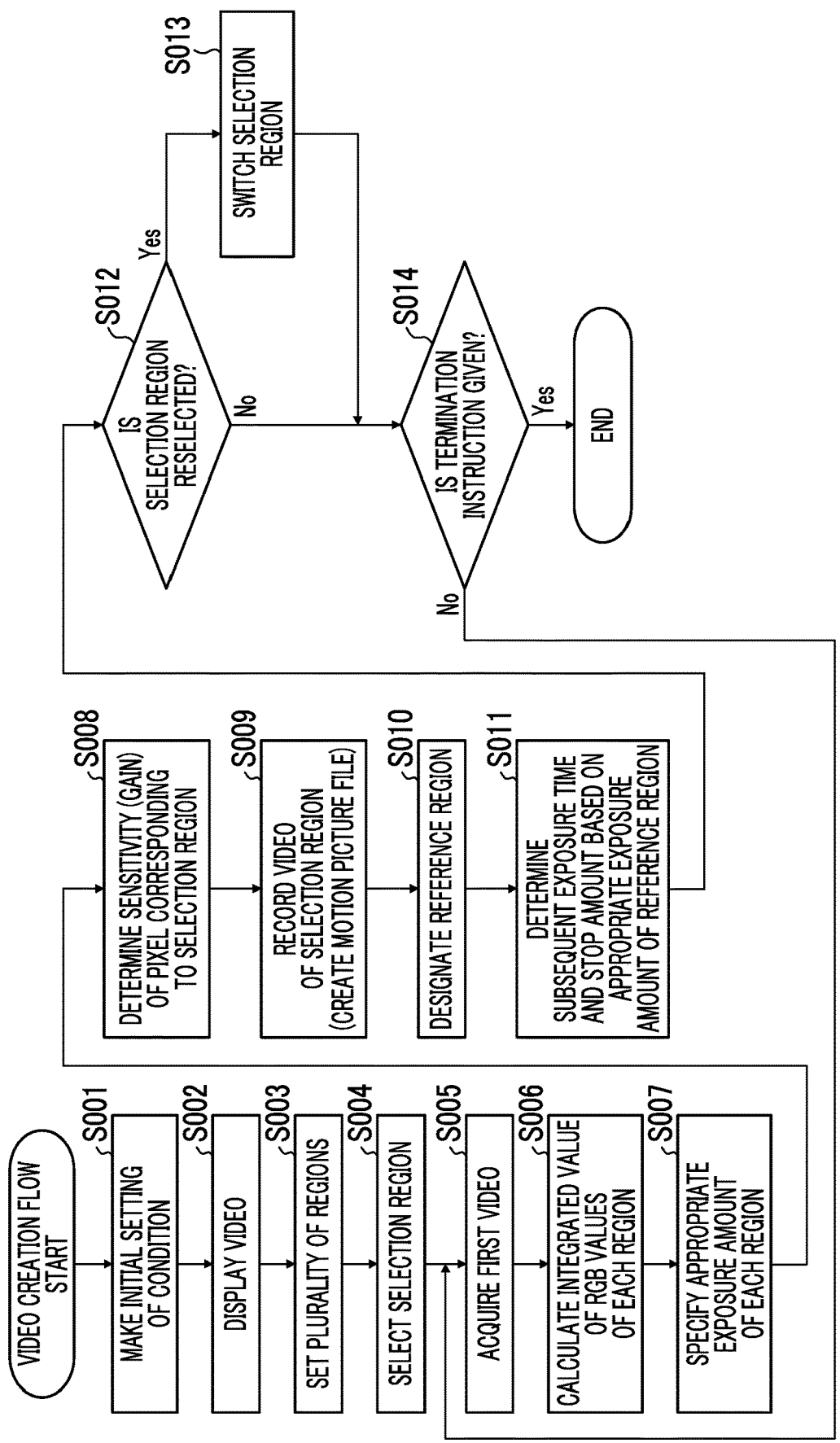
FIG. 9 is a diagram showing a flow of a video creation flow according to the first embodiment which is one embodiment of the present invention.

A flow of the video creation according to the first embodiment will be described with reference to FIG. 9. FIG. 9 is an explanatory diagram of a video creation flow according to the first embodiment.

It should be noted that, in the following, for convenience, a period for capturing one first video (frame image) will be referred to as "one frame".

In the video creation flow, the user first activates the imaging apparatus 10. After the device is activated, the control unit 46 makes initial settings of various conditions including imaging condition and the exposure condition (S001). In this step S001, each of the plurality of parameters that determine the exposure amount, such as the exposure time (shutter speed), the stop value (F-number), and the sensitivity (ISO sensitivity), is preset to an initial value.

Thereafter, video capturing at the first angle of view (that is, capturing of the first video) by the imaging apparatus 10 is started. In conjunction with the start of the video capturing, the display step by the control unit 46 is executed, and the first video, which is the live video, is displayed on the display screen of the display 28 (S002).

The user executes the setting operation described above a plurality of times, and the control unit 46 receives each setting operation to execute the setting step (S003). In this step S003, the control unit 46 sets the plurality of regions A2 in the imaging region A1 of the first video in accordance with the setting operation executed by the user through the first video displayed on the display screen.

In addition, in a case in which the user selects the selection region from among the plurality of regions A2 and inputs the selection result through the touch panel 36 or the like, the control unit 46 executes the selection step (S004). In this step S004, the control unit 46 selects the selection region from among the plurality of regions A2 in accordance with the input operation of the user.

Thereafter, in a case in which the user executes the operation, such as pressing the release button 26, to start recording of the video, step S005 and the subsequent steps are executed.

First, in step S005, the control unit 46 acquires the first video (that is, frame image) for one frame. In subsequent step S006, the control unit 46 calculates the integrated value of the RGB pixel values of the video of each region A2 for each of the plurality of regions A2 set in step S003 in the acquired first video. In subsequent step S007, the control unit 46 specifies the appropriate exposure amount of each region A2 based on the integrated value of the RGB pixel values calculated for each region A2.

After executing step S007, the control unit 46 executes the sensitivity determination step to determine the sensitivity (strictly speaking, gain) of the pixel 42 corresponding to the selection region in the imaging element 40 (S008). In first step S008 of the video creation flow, the sensitivity of the pixel 42 corresponding to the selection region is determined based on the appropriate exposure amount of the selection region, and the exposure time and the stop amount preset to the initial values.

In addition, in step S008, the control unit 46 adjusts the exposure amount of the selection region by changing the gain such that the sensitivity of the pixel 42 corresponding to the selection region becomes the determined sensitivity.

Thereafter, the control unit 46 executes the recording step (creation step) to record the video of the selection region on the recording medium and start the creation of the motion picture file which is the video file (S009). In this step S009, the control unit 46 records the video of the selection region with the sensitivity (gain) determined in step S008. In addition, the control unit 46 displays the video of the selection region on the display screen of the display 28.

Thereafter, the control unit 46 executes the designation step to designate the predetermined region among the plurality of regions A2 set in step S003 as a reference region (S010). In this step S010, of the first region and the second region included in the plurality of regions A2, the second region having a smaller appropriate exposure amount than the first region is designated as the reference region. Here, the first region and the second region are relative concepts, and in a case in which the plurality of regions A2 are compared, the region having a larger appropriate exposure amount corresponds to the first region and the region having a smaller appropriate exposure amount corresponds to the second region.

It should be noted that, in the present embodiment, the region A2 having the minimum appropriate exposure amount among the plurality of regions A2 is designated as the reference region. It should be noted that the present invention is not limited to this, and the region A2 having a smaller appropriate exposure amount than any other region A2 may be designated as the reference region.

After designating the reference region, the control unit 46 executes the condition determination step to determine the exposure time and the stop amount (hereinafter, subsequent exposure time and stop amount) in a case in which the first video is captured in the subsequent frame (S011). In this step S011, the control unit 46 determines the subsequent exposure time and stop amount based on the appropriate exposure amount in the reference region.

In addition, in step S011, the control unit 46 adjusts these values such that the exposure time and the stop amount become the values determined in step S011. As a result, in the subsequent frame, the first video (frame image) is captured with the exposure time and the stop amount based on the appropriate exposure amount of the reference region designated immediately before.

Among the steps described above, a series of operations of step S005 and the subsequent steps of acquiring the first video is repeatedly executed during the period when the video is recorded. Therefore, in a case in which the exposure time and the stop amount are determined in step S011, the first video is acquired in the immediately following frame (that is, in the second and subsequent steps S005) with the exposure time and the stop amount described above.

In addition, in a case in which the user selects the selection region once, then reselects the selection region and executes the input operation again (S012), the control unit 46 executes the switching step (S013). In this step S013, the control unit 46 reselects and switches the selection region from among the plurality of regions A2 in accordance with the input operation of the user.

In a case in which step S013 is executed and the selection region is switched, the control unit 46 records each of the video of the selection region before the switching step and the video of the selection region after the switching step to create the video file in step S009 in the immediately following frame. More specifically, the control unit 46 combines the video of the selection region before the switching step and the video of the selection region after the switching step to create the motion picture file as the video file.

Moreover, the control unit 46 repeats steps S005 to S013 described above until the user executes the predetermined operation and gives a termination instruction (S014).

As described above, the present embodiment, the region having a smaller appropriate exposure amount among the plurality of regions A2 is set as the reference region, and the subsequent exposure time and stop amount are determined based on the appropriate exposure amount of the reference region. As a result, excessive exposure (overexposure) in a case in which the selected video is switched is suppressed, and a good image quality of the switched video can be obtained.

The effect described above will be described in detail. In a case in which the selection region is switched, it is common to determine the exposure time and the stop amount such that the exposure amount of the post-switching selection region becomes the appropriate exposure amount.

On the other hand, among the plurality of regions A2, the brightness of the region A2 other than the selection region (hereinafter referred to as non-selection region) may be larger than the brightness of the selection region. In such a case, in a case in which the exposure amount of the selection region is determined based on the appropriate exposure amount, the RGB pixel value of the video of the non-selection region may be saturated. As a result, there is a risk that the appropriate exposure amount of each region A2 is not calculated correctly. In addition, in a case in which the non-selection region (strictly speaking, non-selection region in which the appropriate exposure amount is smaller than the selection region) is switched to the selection region, excessive exposure may occur.

On the other hand, in the present embodiment, the region A2 having a smaller appropriate exposure amount is smaller (strictly speaking, region A2 having the minimum appropriate exposure amount) is set as the reference region, and the exposure time and the stop amount are determined based on the appropriate exposure amount in the reference region. As a result, it is possible to suppress the problems described above, such as excessive exposure, and it is possible to more appropriately determine the conditions, such as the exposure time during video capturing.

In addition, in the present embodiment, as described above, steps S005 to S013 described above are executed for each frame while the video is recorded. Moreover, in a case in which the first region having a larger appropriate exposure amount is selected as the selection region from among the plurality of regions A2, in the second and subsequent frames, the exposure amount of the selection region is determined based on the conditions determined in the immediately preceding frame.

Specifically, in the sensitivity determination step executed in step 008 in the second and subsequent frames, the sensitivity (gain) of the pixel 42 corresponding to the selection region (that is, first region) is determined. In this case, the sensitivity is determined based on the appropriate exposure amount of the first region, which is the selection region at that time, and the exposure time and the stop amount determined in step S011 (that is, condition determination step) in the immediately preceding frame. In addition, in the present embodiment, the sensitivity described above is determined to be higher than the sensitivity of the pixel 42 corresponding to the second region which is the reference region. As a result, the sensitivity of the pixel 42 corresponding to the selection region is appropriately determined, and the exposure amount of the first region, which is the selection region, is adjusted to be the appropriate exposure amount.

It should be noted that, as a method of increasing and optimizing the exposure amount of the selection region, a method other than a method of increasing the sensitivity of the pixel 42 corresponding to the selection region as described above is considered. For example, the exposure amount of the selection region may be increased by executing frame combining on the video of the selection region. Frame combining is signal processing in which the image signals for a plurality of consecutive frames on a time axis are added together and signal-added.

It should be noted that a moving subject is reflected in the video in which frame combining is executed, an afterimage of the subject may occur along with frame combining. Therefore, the adjustment of the exposure amount by frame combining should be applied only to the video in which the subject is not moved.

Second Embodiment

Figure 10:
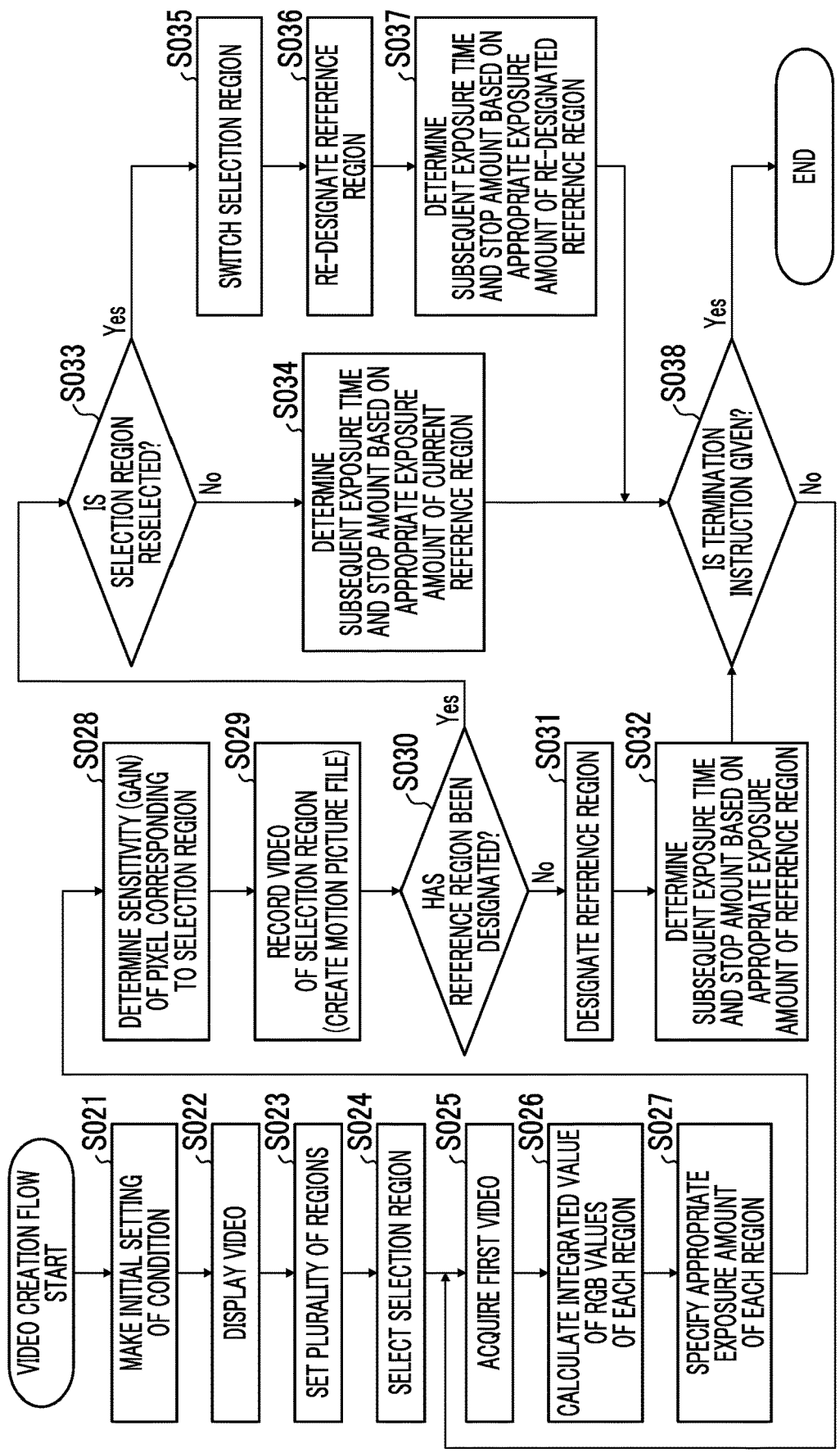
FIG. 10 is a diagram showing a flow of a video creation flow according to a second embodiment which is one embodiment of the present invention.

With reference to FIG. 10, a second embodiment will be described in which the reference region is re-designated only in a case in which the selection region is switched. FIG. 10 is an explanatory diagram of a video creation flow according to the second embodiment.

It should be noted that, in the following, the items different from those in the first embodiment will be mainly described in the second embodiment.

As can be seen by comparing FIGS. 9 and 10, each step in the video creation flow according to the second embodiment is generally common to each step in the video creation flow according to the first embodiment.

Specifically, steps S021 to S029 in the video creation flow according to the second embodiment are common to steps S001 to S009 in the video creation flow according to the first embodiment. In addition, the video creation flow according to the second embodiment is common to the video creation flow according to the first embodiment in that step S025 and the subsequent steps are repeated for each frame during the period in which the video is recorded.

On the other hand, in the second embodiment, the designation step is executed to designate the reference region once, the designation step is executed only in a case in which the switching step is executed thereafter. In addition, in the second embodiment, the condition determination step is executed each time the designation step is executed. In the points described above, the second embodiment is different from the first embodiment.

A difference of the video creation flow according to the second embodiment from the first embodiment will be described. As shown in FIG. 10, in the second embodiment, it is determined whether or not the reference region has already been designated in each frame (S030).

In a case in which the reference region is not designated, the control unit 46 executes the designation step to designate the second region (specifically, the region having the minimum appropriate exposure amount) among the plurality of regions A2 as the reference region (S031). Thereafter, the control unit 46 executes the condition determination step to determine the subsequent exposure time and stop amount based on the appropriate exposure amount of the reference region designated in step S031 (S032).

It should be noted that, in a normal case, steps S031 and S032 are executed only immediately after the start of recording the captured video (that is, first frame).

In a case in which the reference region has already been designated, the user selects the selection region once and then reselects the selection region to determine whether or not the input operation is executed again (S033). In a case in which the selection region is not reselected, the reference region at that time (that is, current reference region) is maintained. Moreover, in a case in which the control unit 46 determines the subsequent exposure time and stop amount in the condition determination step, the control unit 46 determines these values based on the appropriate exposure amount of the current reference region (S034).

On the other hand, in a case in which the selection region is reselected, the control unit 46 executes the switching step to reselect and switch the selection region from among the plurality of regions A2 in accordance with the input operation of the user (S035). In addition, the control unit 46 executes the designation step in conjunction with the switching step to re-designate the reference region in the designation step (S036). Further, the control unit 46 determines the subsequent exposure time and stop amount based on the appropriate exposure amount of the re-designated reference region in the immediately following condition determination step (S037).

In the video creation flow according to the second embodiment, steps S025 to S037 are repeatedly executed until the user gives the termination instruction (S038).

As described above, in the video creation flow according to the second embodiment, the re-designation of the reference region is permitted only in a case in which the selection region is switched. As a result, the image quality of the selected video becomes more stable as compared with the first embodiment in which the reference region is changed for each frame.

It should be noted that the second embodiment is common to the first embodiment except for the difference described above, and the same effect as that obtained in the first embodiment can be obtained.

Third Embodiment

Figure 11:
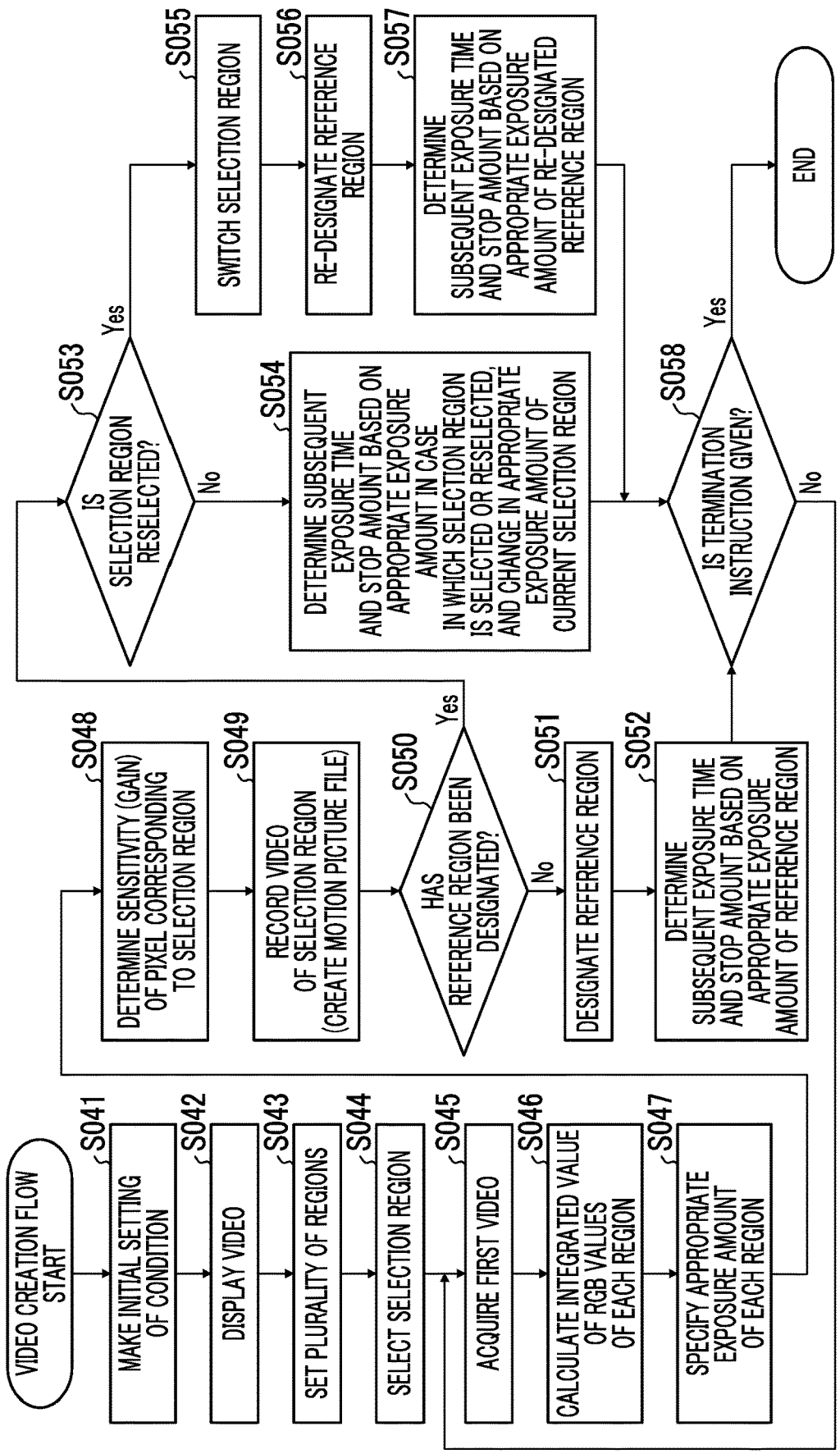
FIG. 11 is a diagram showing a flow of a video creation flow according to a third embodiment which is one embodiment of the present invention.

With reference to FIG. 11, a third embodiment will be described in which the conditions, such as the exposure time, are determined based on the appropriate exposure amount of the reference region immediately after the selection or reselection of the selection region is executed. FIG. 11 is an explanatory diagram of a video creation flow according to the third embodiment. It should be noted that, in the following, the items different from those in the first embodiment will be mainly described in the third embodiment.

As shown in FIGS. 10 and 11, each step in the video creation flow according to the third embodiment is substantially common to each step in the video creation flow according to the second embodiment.

In the video creation flow according to the third embodiment, immediately after the selection region is first selected or immediately after the selection region is reselected, the control unit 46 executes the designation step (S051 and S056). In the designation step, the control unit 46 designates the region A2 corresponding to the second region at that time (strictly speaking, the region A2 having the minimum appropriate exposure amount) as the reference region. Moreover, in the condition determination step (that is, S052 and S057) executed immediately after the designation step, the conditions, such as the exposure time, are determined based on the appropriate exposure amount of the reference region designated in the designation step. In the following, such a condition determination step will be referred to as a "first determination step".

On the other hand, in the frame in which the selection region has been selected and the selection region is not reselected (switched), the designation step is not executed. In the condition determination step (S054) in such a frame, the conditions, such as the exposure time, are determined based on the appropriate exposure amount of the reference region at the time when the selection region is selected or time when the selection region is reselected, and a change amount of the appropriate exposure amount of the current selection region. In the following, such a condition determination step will be referred to as a "second determination step".

In the first determination step, the conditions, such as the exposure time, are determined based on the appropriate exposure amount of the reference region at that time. In addition, the second determination step is executed in the adjustment step after the first determination step is executed. In the second determination step, the adjustment amount of the exposure amount (specifically, the exposure amount in a case in which the first video is captured) in the adjustment step is determined in consideration of the temporal change of the appropriate exposure amount of the selection region at that time. In the adjustment step, the exposure amount in a case in which the first video is captured is adjusted based on the conditions, such as the exposure time determined in the first determination step, and the adjustment amount determined in the second determination step.

The contents described above will be described in detail with reference to FIGS. 12 to 15.

Figure 12:
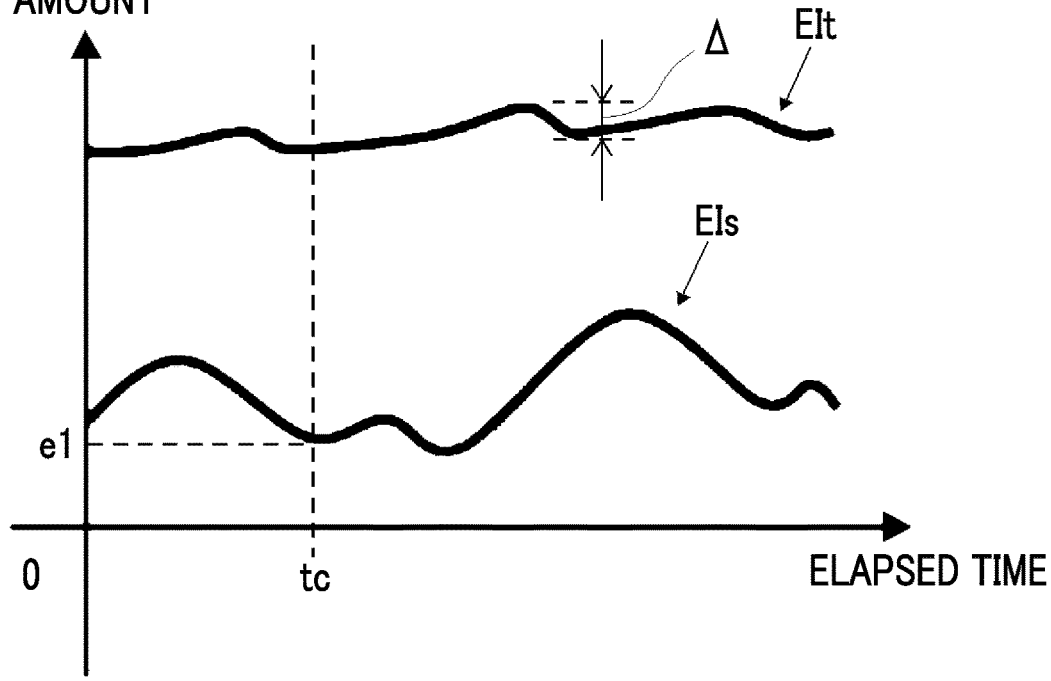
FIG. 12 is a diagram showing a temporal change in an appropriate exposure amount of each of a reference region and the selection region.
Figure 13:
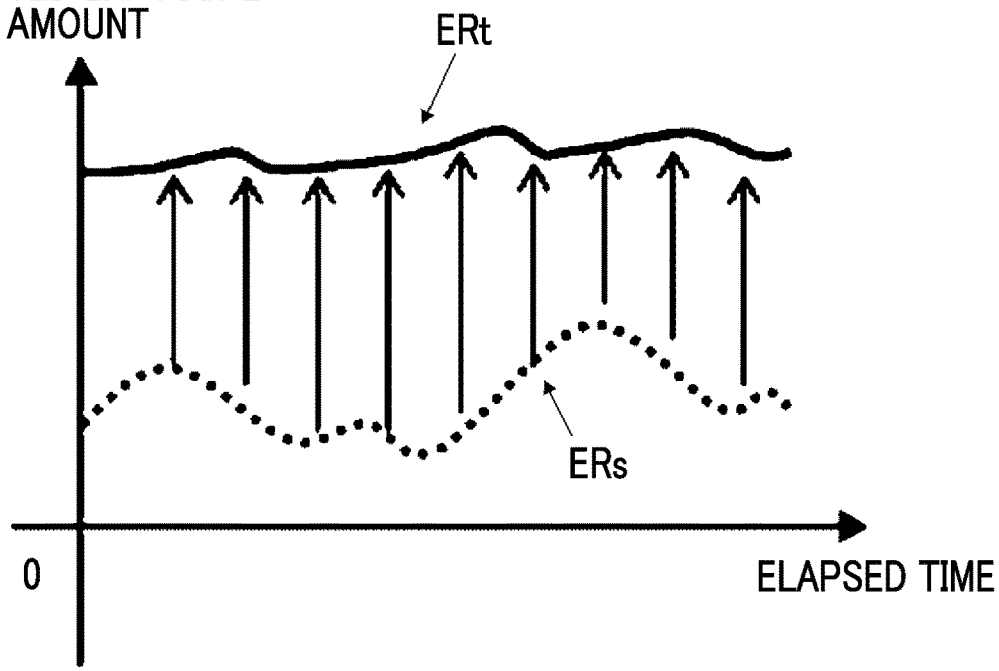
FIG. 13 is a diagram showing an adjusted exposure amount of the selection region in a case in which the adjustment continues based on the appropriate exposure amount of the reference region.
Figure 14:
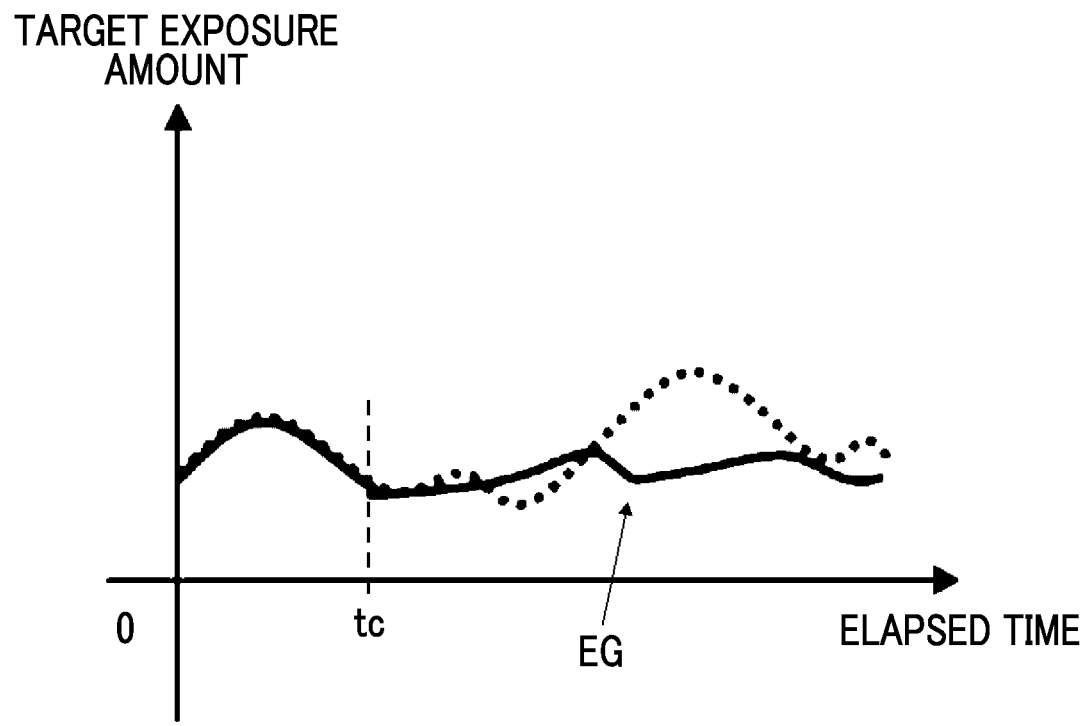
FIG. 14 is a diagram showing a target exposure amount in the third embodiment.
Figure 15:
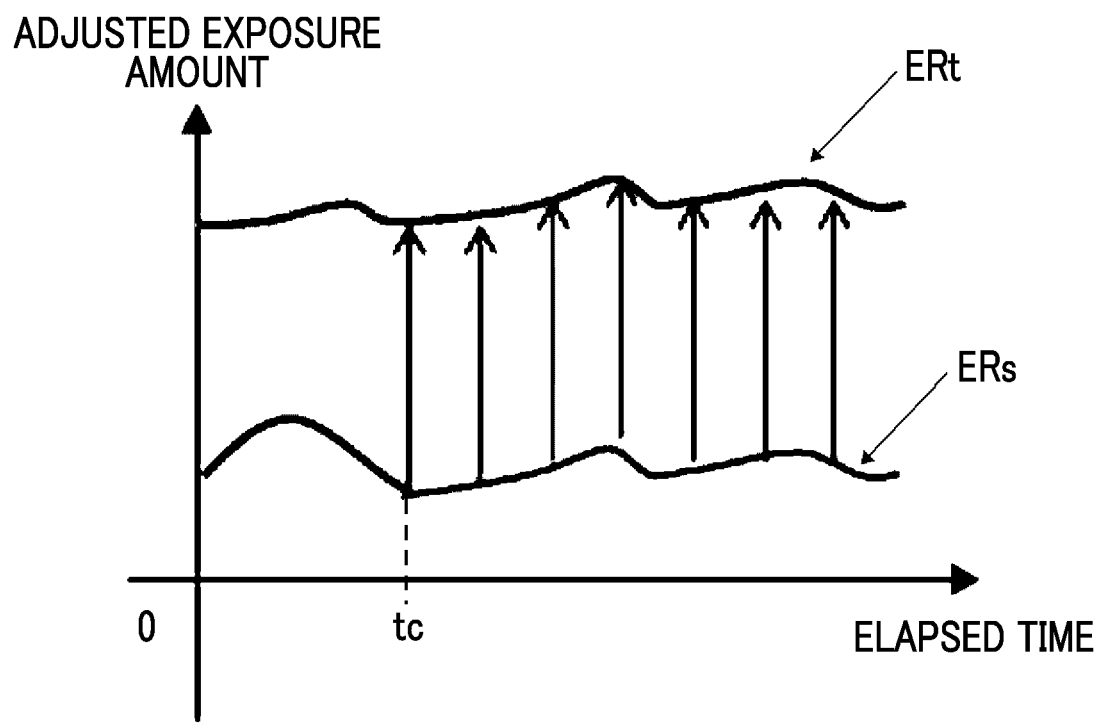
FIG. 15 is a diagram showing a transition in the adjusted exposure amount of each of the reference region and the selection region in the third embodiment.

FIG. 12 shows the temporal change in the appropriate exposure amount of each of the reference region and the selection region. FIG. 13 shows the adjusted exposure amount of the selection region in a case in which the adjustment continues based on the appropriate exposure amount of the reference region. FIG. 14 shows a target exposure amount in the third embodiment. FIG. 15 shows a transition in the adjusted exposure amount of each of the reference region and the selection region in the third embodiment.

It should be noted that, in each of FIGS. 12 to 15, the horizontal axis indicates an elapsed time from a start time of video recording (specifically, the number of elapsed frames), and the vertical axis indicates the magnitude of the exposure amount.

Here, the "adjusted exposure amount" means an actual value of the exposure amount adjusted for each frame in the adjustment step, which is finally reached in each frame.

In addition, the "target exposure amount" is a target value of the exposure amount adjusted for each frame in the adjustment step, which is expected to be achieved in each frame, and is set to a value corresponding to the appropriate exposure amount (for example, value corresponding to the appropriate exposure amount).

As a specific case, it is assumed that the appropriate exposure amount of each of the reference region and the selection region is changed as shown in FIG. 12. In this case, the appropriate exposure amount of the selection region (denoted as EIt in FIG. 12) is relatively stable, while the appropriate exposure amount of the reference region (denoted as EIs in FIG. 12) fluctuates greatly. It should be noted that, in the case shown in FIG. 12, the selection region is reselected (switched) at the time when the elapsed time is tc.

In the case described above, in a case in which the exposure amount in a case in which the first video is captured is adjusted for each frame, the exposure amount is adjusted based on the appropriate exposure amount of the reference region in each frame. In this case, the adjusted exposure amount of the reference region and the selection region transitions as shown in FIG. 13. The adjusted exposure amount of the reference region (denoted as ERs in FIG. 13) fluctuates greatly in the same manner as the appropriate exposure amount. The adjusted exposure amount of the selection region (denoted as ERt in FIG. 13) shows the same change tendency as the appropriate exposure amount by changing the sensitivity (gain) of the pixel 42 corresponding to the selection region such that the appropriate exposure amount is obtained.

However, the sensitivity (gain) that determines the adjusted exposure amount of the selection region is affected by the adjusted exposure amount of the reference region, in other words, the appropriate exposure amount of the reference region. Therefore, in a case in which the appropriate exposure amount of the reference region is changed greatly, there is a risk that the sensitivity (gain) is changed greatly, which may cause the problems, such as the increase or decrease in noise in the video of the selection region.

On the other hand, in the third embodiment, the first determination step is executed by designating the reference region only immediately after the selection region is selected or immediately after the selection region is reselected. In the first determination step, the conditions, such as the exposure time, are determined based on the appropriate exposure amount of the reference region (denoted as e1 in FIG. 12) in a case in which the selection region is selected or reselected.

In addition, in the period after the first determination step (that is, the period in which the selection region has been selected and the selection region is not reselected), the second determination step is executed for each frame. In the second determination step of each frame, the adjustment amount of the exposure amount is determined based on the appropriate exposure amount e1 of the reference region in a case in which the selection region is selected or reselected and the change amount of the appropriate exposure amount of the current selection region. Here, the "change amount of the appropriate exposure amount of the selection region" is a difference between the appropriate exposure amount of the selection region in the immediately preceding frame and the appropriate exposure amount of the selection region in the current frame, and is denoted as symbol Δ in FIG. 12.

As described above, the first determination step is executed, and thereafter, the second determination step is executed for each frame, so that the target exposure amount in each frame is determined. More specifically, as shown in FIG. 14, the target exposure amount (denoted as EG in FIG. 14) at the time tc in a case in which the selection region is reselected is set based on the appropriate exposure amount e1 of the reference region at that time. The subsequent target exposure amount EG is determined in accordance with the change of the appropriate exposure amount in the selection region, and specifically, is changed by the difference Δ of the appropriate exposure amount in each frame.

Moreover, in each frame during the adjustment step, the conditions, such as the exposure time, are determined such that the exposure amount in a case in which the first video is captured is the target exposure amount EG determined in each frame. As a result, the adjusted exposure amount ERs of the reference region becomes the exposure amount corresponding to the target exposure amount EG as shown in FIG. 15. Here, since the target exposure amount EG reflects the change in the appropriate exposure amount in the selection region, the adjusted exposure amount ERs of the reference region relatively stably transitions as shown in FIG. 15.

In addition, in each frame during the adjustment step, the exposure amount of the selection region is adjusted based on the conditions, such as the exposure time determined in each frame. More specifically, in each frame, the sensitivity (gain) of the pixel 42 corresponding to the selection region is determined in accordance with the conditions, such as the exposure time, determined in each frame and the appropriate exposure amount of the selection region in each frame. As a result, the adjusted exposure amount ERt of the selection region becomes the exposure amount corresponding to the appropriate exposure amount in each frame, as shown in FIG. 15.

Further, as shown in FIG. 15, the sensitivity (gain) that determines the adjusted exposure amount of the selection region is relatively stable. This is because the target exposure amount EG, which is a base for determining the sensitivity, is stable. As a result, the problem, such as the increase or decrease in noise in the video of the selection region, is suppressed.

As described above, in the third embodiment, the conditions, such as the exposure time, are determined based on the appropriate exposure amount of the reference region only immediately after the selection region is selected or immediately after the selection region is reselected. For the other periods, the adjustment amount of exposure amount is determined based on the change in the appropriate exposure amount in the selection region. As a result, the image quality of the video of the selection region can be stabilized while the selection region is not reselected (switched).

Fourth Embodiment

Figure 16:
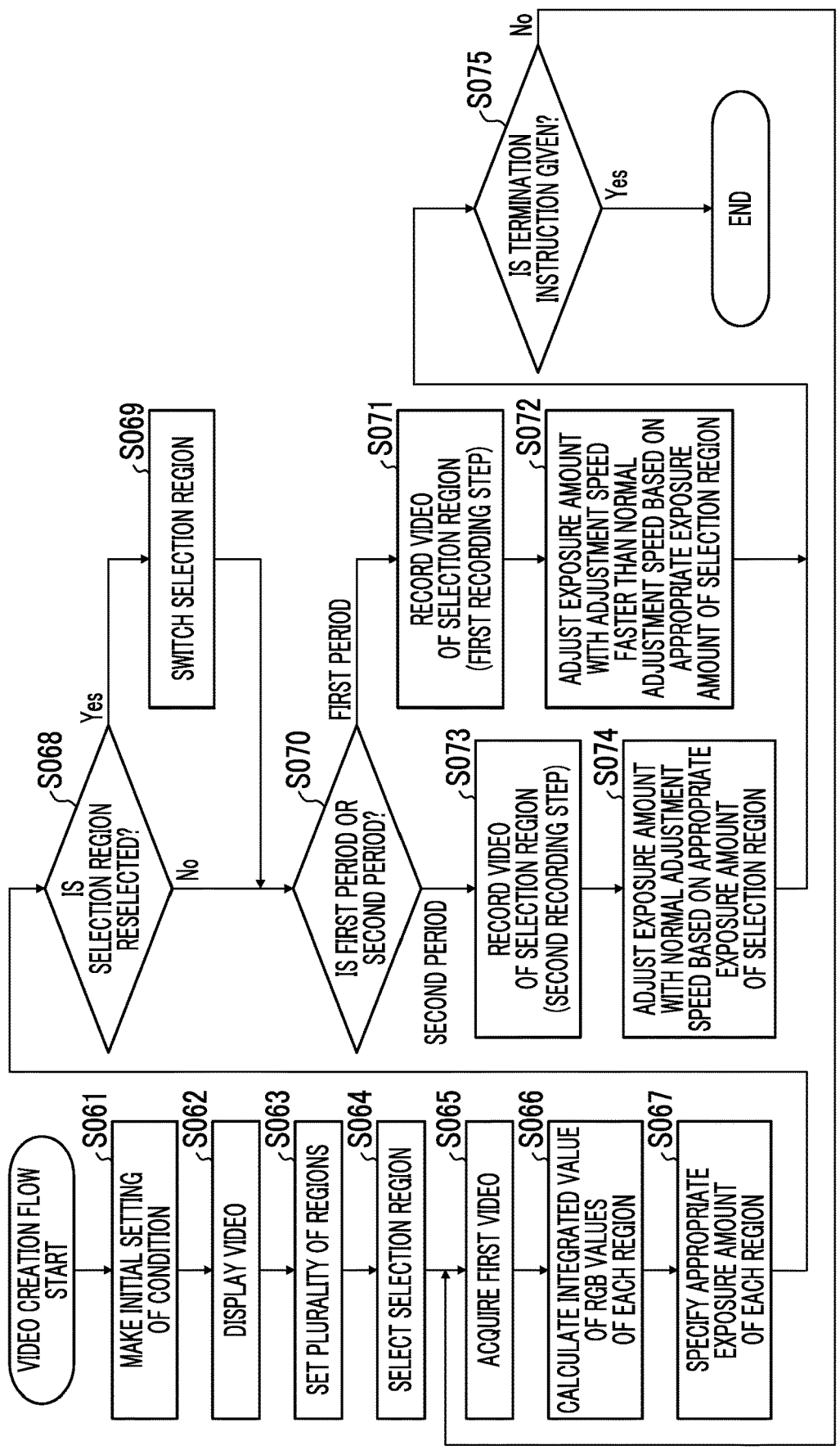
FIG. 16 is an explanatory diagram of a video creation flow according to a fourth embodiment which is one embodiment of the present invention.

With reference to FIG. 16, a fourth embodiment will be described in which the exposure amount is adjusted at a faster adjustment speed than a normal adjustment speed immediately after the switching step is executed. FIG. 16 is an explanatory diagram of a video creation flow according to the fourth embodiment.

As shown in FIG. 16, in the video creation flow according to the fourth embodiment, steps S061 to S067 are common to steps S001 to S007 in the video creation flow according to the first embodiment.

In the following, steps S068 to S074 in the video creation flow according to the fourth embodiment will be described in detail. In the video creation flow according to the fourth embodiment, in a case in which the switching step is executed, the subsequent steps are changed in accordance with the elapsed time from the execution time of the switching step (S070).

Specifically, the control unit 46 executes the switching step at a certain time (certain frame) to switch the selection region. In this case, the control unit 46 measures the elapsed time from that frame (strictly speaking, the number of elapsed frames) in step S070. Moreover, the control unit 46 executes a first recording step between a time when the immediately preceding switching step is executed and a time when a first period elapses (S071). The first recording step is a step of recording the video of the selection region in the first period. The first period is determined as any period, but may be preferably determined within 1 second.

In addition, in a case in which the current time (current frame) is in the first period, the control unit 46 executes the adjustment step of adjusting the exposure amount of the selection region in preparation for the subsequent frame (S072). In this step S072, the exposure amount of the selection region is adjusted at a faster adjustment speed than the normal adjustment speed based on the appropriate exposure amount at that time. Specifically, in the adjustment step, in a case in which the stop driving unit 23 is driven to change the stop amount for adjusting the exposure amount, the drive speed of the stop driving unit 23 is set to be faster than a normal drive speed.

It should be noted that the adjustment speed in the adjustment step in the first period can be optionally determined as long as the adjustment speed is faster than the normal adjustment speed, but is preferably faster than the normal adjustment speed by 1.5 times or more, and more preferably faster than the normal adjustment speed by twice or more.

On the other hand, after the first period has elapsed from the execution of the immediately preceding switching step, that is, in a case in which the current time (current frame) is in a second period other than the first period, the control unit 46 executes a second recording step (S073). The second recording step is a step of recording the video of the selection region in the second period.

In addition, in a case in which the current time (current frame) is in the second period, the control unit 46 executes the adjustment step of adjusting the exposure amount of the selection region in preparation for the subsequent frame (S074). In this step S074, the exposure amount of the selection region is adjusted at the normal adjustment speed based on the appropriate exposure amount at that time. Specifically, the stop driving unit 23 is driven at the normal drive speed to change the stop amount in order to adjust the exposure amount.

As described above, in the fourth embodiment, in the adjustment step executed in the first period, the adjustment speed of the exposure amount (specifically, the drive speed of the stop driving unit 23) is set to be faster than in the adjustment step executed in the second period. As a result, in a case in which the switching step is executed, the exposure amount of the selection region after the switching step can be promptly adjusted (optimized). As a result, the video of the selection region after the switching step is acquired with the appropriate exposure amount, and the image quality is improved.

It should be noted that, in the case described above as a specific example of the fourth embodiment, the exposure amount of the selection region is adjusted in the adjustment step. It should be noted that examples of the conditions that should be adjusted promptly after the switching step is executed include the white balance of the video of the selection region, the focus of the imaging lens 14, and the like, in addition to the exposure amount.

In the fourth embodiment, the adjustment step of adjusting at least one condition of the exposure amount of the selection region, the white balance of the video of the selection region, or the focus can be executed in each of the first period and the second period. In this case, in the adjustment step executed in the first period, the adjustment speed of the conditions (conditions which is an adjustment target) need only be faster than that in the adjustment step executed in the second period.

Specifically, in a case in which the stop driving unit 23 is driven to change the stop amount in the adjustment step for adjusting the exposure amount, in the adjustment step in the first period, the drive speed of the stop driving unit 23 need only be set to be faster than in the adjustment step in the second period.

In addition, in a case in which the optical component for focus adjustment in the adjustment step, the movement speed of the optical component for focus 19 need only be set to be faster in the adjustment step in the first period than in the adjustment step in the second period.

Fifth Embodiment

Figure 17:
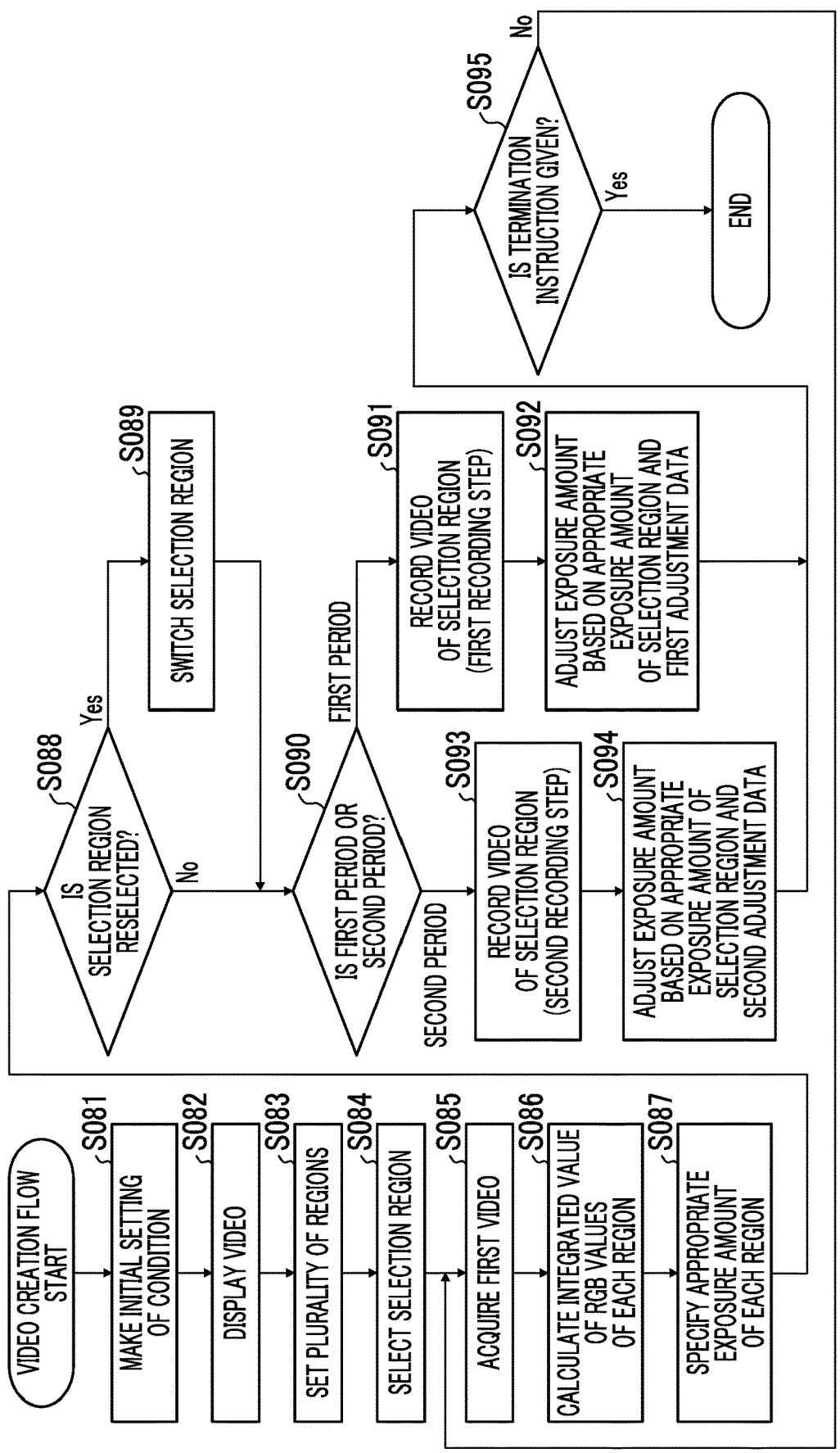
FIG. 17 is an explanatory diagram of a video creation flow according to a fifth embodiment which is one embodiment of the present invention.

With reference to FIGS. 17 and 18, a fifth embodiment will be described in which the parameters other than the stop amount are preferentially changed to adjust the exposure amount immediately after the switching step is executed. FIG. 17 is an explanatory diagram of a video creation flow according to the fifth embodiment. FIG. 18 shows an example of a change pattern determined by adjustment data.

It should be noted that each numerical value of the change pattern shown in FIG. 18 is a value determined for convenience of description, and is different from the value defined in an actual change pattern.

The video creation flow according to the fifth embodiment is generally common to the video creation flow according to the fourth embodiment. That is, in the video creation flow according to the fifth embodiment, first, various conditions are initially set, the first video is displayed along with the start of video capturing, the plurality of regions A2 are set, and the selection region is selected from among the plurality of regions A2 (S081 to S084). Thereafter, step S085 and the subsequent steps (steps S085 to S094) are executed triggered by the user pressing down the release button 26 or the like.

Specifically, the first video for one frame is acquired, the integrated value of the RGB pixel values is calculated for each of the plurality of regions A2, and the appropriate exposure amount is specified from the integrated value (S085 to S087). Thereafter, the video of the selection region is recorded (S091 and S093), and the exposure amount of the selection region is adjusted in preparation for the subsequent frame (S092 and S094).

In addition, in a case in which the selection region is reselected, the switching step is executed to switch the selection region (S088 and S089). The step after the switching step is executed is changed in accordance with the elapsed time from the execution time of the switching step (S090).

Specifically, in a case in which the current time (current frame) is in the first period described above, the control unit 46 executes the first recording step (S091). In addition, in a case in which the current time (current frame) is in the first period, the control unit 46 executes the first adjustment step to adjust the exposure amount of the selection region in preparation for the subsequent frame (S092).

On the other hand, in a case in which the current time (current frame) is in the second period described above, the control unit 46 executes the second recording step (S093). In addition, in a case in which the current time (current frame) is in the second period, the control unit 46 executes the second adjustment step to adjust the exposure amount of the selection region in preparation for the subsequent frame (S094).

A series of steps up to the above (that is, steps S085 to S094) is repeatedly executed until the user gives the termination instruction (S095).

The first adjustment step and the second adjustment step in the fifth embodiment will be described. In each of the adjustment steps, the exposure amount of the selection region is adjusted to the target exposure amount using the adjustment data based on the appropriate exposure amount at that time. More specifically, in each of the adjustment steps, the value of each of the plurality of parameters including the exposure time (shutter speed), the sensitivity (ISO sensitivity) of the pixel 42, and the stop amount (F-number) are determined based on the adjustment data. Thereafter, the value of each parameter is changed to the determined value, and the exposure amount of the selection region is adjusted to the target exposure amount.

The adjustment data is data that determines the change pattern, is prepared in the same number as the change patterns, and is recorded in the internal memory 50 or the buffer 56 of the imaging apparatus body 12. The change pattern determines the pattern (change tendency) in which the value of each of the plurality of parameters is changed in order to adjust the exposure amount to the target exposure amount.

Moreover, in the fifth embodiment, the adjustment data used for adjusting to the same target exposure amount varies between the first adjustment step and the second adjustment step. That is, the value of each of the plurality of parameters determined for the same target exposure amount is used varies between the first adjustment data used in the first adjustment step and the second adjustment data used in the second adjustment step.

A difference between the first adjustment data and the second adjustment data will be described with reference to FIG. 18. Both of the two adjustment data shown in FIG. 18 determine the change pattern of each of the stop amount, the exposure time, and the sensitivity for adjusting the exposure amount from a value ep to a target value et (target exposure amount). That is, as shown in FIG. 18, in the change pattern determined by the adjustment data, a value of each parameter at an adjustment start time and a value of each parameter at an adjustment termination time are common between the two adjustment data.

On the other hand, in the change pattern determined by the first adjustment data (shown on the upper side in FIG. 18), the stop amount is gradually increased. The exposure time, which is the parameter other than the stop amount, is increased promptly immediately after the start of adjustment, and then is decreased as the stop amount is increased.

On the other hand, in the change pattern determined by the second adjustment data (shown on the lower side in FIG. 18), the stop amount is increased at once to a final value immediately after the start of adjustment, and is maintained at the final value thereafter. The exposure time remains unchanged and is maintained at a fixed value during the adjustment period.

As described above, in the change pattern determined in the first adjustment data, a change degree of the stop amount (change amount per hour) for the target exposure amount is smaller than that in the change pattern of the second adjustment data.

Stated another way, in the second adjustment step using the second adjustment data, the stop amount is preferentially changed in a case in which the exposure amount is adjusted, whereas in the first adjustment step using the first adjustment data, the parameter other than the stop amount is preferentially changed in a case in which the exposure amount is adjusted.

As described above, in the fifth embodiment, in a case in which the exposure amount is adjusted immediately after the selection region is switched, the parameters other than the stop amount (specifically, exposure time) are changed in preference to the change of the stop amount accompanied by mechanical driving. Since the exposure time, that is, the shutter speed of the electronic shutter can be changed by digital processing, the exposure time can be changed more promptly than the stop amount. As a result, it is possible to promptly adjust the exposure amount of the post-switching selection region. In addition, since the slight fluctuation of the brightness accompanied by a sudden change of the stop amount is suppressed, it is possible to suppress the influence of the slight fluctuation on the image quality of the video. As a result, the image quality of the video of the selection region after the switching step can be improved.

It should be noted that, in the case described above, the exposure time is changed in preference to the stop amount in the first adjustment step, but the present invention is not limited to this, and the sensitivity (gain) of the pixel 42 corresponding to the selection region may be changed in preference to the stop amount in the first adjustment step.

In addition, in the configuration in which the electronic dimming filter 21 is provided, the dimming degree of the electronic dimming filter 21 may be included in the plurality of parameters for adjusting the exposure amount. In such a case, the dimming degree of the electronic dimming filter 21 (more directly, the voltage applied to the electronic dimming filter 21) can be changed in preference to the stop amount. As a result, the change in the stop amount and the increase in the shutter speed can be suppressed.

Sixth Embodiment

In the five embodiments described above, the video is the motion picture, that is, a set of a plurality of frame images consecutively captured at a fixed frame rate. It should be noted that the recorded video is not limited to the motion picture, and may be a still picture.

For example, the control unit 46 displays the first video as a live view image on the display 28, and sets a plurality of partial regions A2 in the imaging region A1 of the first video. Moreover, in a case in which the user selects one of the plurality of set regions A2 as the selection region, the control unit 46 extracts the video of the selection region and displays the extracted video on the display 28 as shown in FIG. 7. In a case in which the recording instruction of the user is input while the extracted video of the selection region is displayed, the control unit 46 records a still picture file of the video of the selection region on the recording medium.

It should be noted that, the recorded video is the still picture, the shutter speed that determines the exposure time may be the shutter speed of the electronic shutter, or may be the shutter speed of the shutter 38 (focal plane shutter), which is a mechanical component.

OTHER EMBODIMENTS

The embodiments described above are specific examples described for ease of understanding of the video creation method according to one embodiment of the present invention and are merely examples, and other embodiments can be also considered.

For example, in the embodiments described above, the imaging apparatus 10 comprising the electronic dimming filter 21 has been described, but the imaging apparatus that does not include the electronic dimming filter 21 may be used.

In addition, in the embodiments described above, the imaging apparatus 10 has the autofocus function, but the present invention is not limited to this, and the imaging apparatus that does not have the autofocus function may be used. That is, the imaging apparatus may be used in which the driving unit for focus 22 is not provided and the focus is adjusted only by the operation of the focus ring 16 (that is, only manual operation).

In addition, in the embodiments described above, the imaging apparatus 10 creates the video file as the video creation apparatus, but the present invention is not limited to this. For example, another device connected to the imaging apparatus by wire or wirelessly, for example, a camera controller or an external recorder may be used as the video creation apparatus. Moreover, the video file of the video captured by the imaging apparatus may be created by these devices.

In addition, in the embodiments described above, the imaging apparatus is the digital camera, but the imaging apparatus may be a portable terminal, such as a video camera, a portable phone with an imaging optical system, a smartphone, or a tablet terminal.

In addition, the imaging lens may be a lens unit externally attached to the imaging optical system of the portable terminal described above.

EXPLANATION OF REFERENCES

10: imaging apparatus
12: imaging apparatus body
13: mount
14: imaging lens
16: focus ring
18: optical component unit
19: optical component for focus
20: stop
21: electronic dimming filter
22: driving unit for focus
23: stop driving unit
24: voltage application unit
26: release button
28: display
30: first operation button
32: second operation button
34: third operation button
36: touch panel
38: shutter
40: imaging element
42: pixel
44: analog signal processing circuit
46: control unit
47: controller
48: video processing unit
50: internal memory
52: card slot
54: memory card
56: buffer
A0: unit region
A1: imaging region
A2: region
L1: optical axis
FR: region setting frame

What is claimed is:

1. A video creation method of creating a video file based on a video captured by an imaging apparatus including an imaging lens and an imaging element, the method comprising:

a setting step of setting, in an imaging region of a first video having a first angle of view, a plurality of regions having a second angle of view smaller than the first angle of view in a current frame;

a designation step of calculating an integrated value of pixel values of each of the plurality of regions, specifying an appropriate exposure amount of each of the plurality of regions according to the corresponding integrated value, and designating, out of a first region and a second region included in the plurality of regions, wherein each of the plurality of regions has a different exposure amount with respect to each other, and wherein the second region has a smaller appropriate exposure amount than the first region as a reference region;

a condition determination step of determining an exposure time and a stop amount for an incidence ray on the imaging lens in a case where the first video is captured for a subsequent frame subsequent to the current frame based on the appropriate exposure amount of the reference region in the current frame, wherein the reference region in the current frame is a region having a minimum appropriate exposure amount among the plurality of regions, and wherein the exposure time and the stop amount for capturing the first video in the subsequent frame are determined based on the appropriate exposure amount in the reference region in the current frame;

an adjusting step of capturing the first video with the determined exposure time and the determined stop amount in the subsequent frame;

a selection step of selecting a selection region from among the plurality of regions in the subsequent frame as an imaging region of a recorded video;

a switching step of selecting another selection region from among the plurality of regions in the subsequent frame; and a creation step of recording the selection region and the another selection region to create the video file.

2. The video creation method according to claim 1, wherein, in the creation step, the video of the selection region before the switching step and the video of the selection region after the switching step are combined to create a motion picture file as the video file.

3. The video creation method according to claim 2, wherein the designation step is executed in a case in which the switching step is executed, and the condition determination step is executed each time the designation step is executed.

4. The video creation method according to claim 2, further comprising:

a sensitivity determination step of determining sensitivity of a pixel among a plurality of pixels included in the imaging element corresponding to the first region based on the appropriate exposure amount of the first region and the condition determined in the condition determination step in a case in which the first region is selected as the selection region.

5. The video creation method according to claim 4, wherein, in the sensitivity determination step, the sensitivity of the pixel corresponding to the first region is determined to be higher than sensitivity of the pixel corresponding to the second region which is the reference region.

6. The video creation method according to claim 2, further comprising:

an adjustment step of chronologically adjusting an exposure amount in a case in which the first video is captured by chronologically changing the condition, wherein the condition determination step includes
a first determination step of determining the condition based on the appropriate exposure amount of the reference region, and
a second determination step of determining an adjustment amount of the exposure amount in the adjustment step based on the appropriate exposure amount of the selection region, and
the adjustment step is executed based on the condition determined in the first determination step and the adjustment amount determined in the second determination step.

7. The video creation method according to claim 6,
wherein the first determination step is executed in a case in which the switching step is executed, and
the second determination step is executed in the adjustment step after the first determination step is executed.

8. The video creation method according to claim 1,
wherein the designation step is executed in a case in which the switching step is executed, and
the condition determination step is executed each time the designation step is executed.

9. The video creation method according to claim 1, further comprising:
a sensitivity determination step of determining sensitivity of a pixel among a plurality of pixels included in the imaging element corresponding to the first region based on the appropriate exposure amount of the first region and the condition determined in the condition determination step in a case in which the first region is selected as the selection region.

10. The video creation method according to claim 9,
wherein, in the sensitivity determination step, the sensitivity of the pixel corresponding to the first region is determined to be higher than sensitivity of the pixel corresponding to the second region which is the reference region.

11. The video creation method according to claim 1, further comprising:
an adjustment step of chronologically adjusting an exposure amount in a case in which the first video is captured by chronologically changing the condition,
wherein the condition determination step includes
a first determination step of determining the condition based on the appropriate exposure amount of the reference region, and
a second determination step of determining an adjustment amount of the exposure amount in the adjustment step based on the appropriate exposure amount of the selection region, and
the adjustment step is executed based on the condition determined in the first determination step and the adjustment amount determined in the second determination step.

12. The video creation method according to claim 11,
wherein the first determination step is executed in a case in which the switching step is executed, and
the second determination step is executed in the adjustment step after the first determination step is executed.

13. The video creation method according to claim 1, further comprising:
a display step of displaying the first video on a display screen,
wherein, in the setting step, the plurality of regions are set in accordance with a setting operation executed by a user through the first video displayed on the display screen.

* * * * *